US007084846B2

(12) United States Patent
Adachi et al.

(10) Patent No.: US 7,084,846 B2
(45) Date of Patent: Aug. 1, 2006

(54) LIQUID CRYSTAL DISPLAY DEVICE

(75) Inventors: Takako Adachi, Nara (JP); Makoto Shiomi, Nara (JP)

(73) Assignee: Sharp Kabushiki Kaisha, Osaka (JP)

(*) Notice: Subject to any disclaimer, the term of this patent is extended or adjusted under 35 U.S.C. 154(b) by 235 days.

(21) Appl. No.: 10/622,870

(22) Filed: Jul. 18, 2003

(65) Prior Publication Data

US 2004/0017343 A1 Jan. 29, 2004

Related U.S. Application Data

(63) Continuation of application No. 09/820,021, filed on Mar. 28, 2001, now abandoned.

(30) Foreign Application Priority Data

Mar. 29, 2000 (JP) ............................ 2000-091832
Mar. 31, 2000 (JP) ............................ 2000-096765
Feb. 8, 2001 (JP) ............................ 2001-032773
Feb. 15, 2001 (JP) ............................ 2001-038246

(51) Int. Cl.
*G09G 3/34* (2006.01)
*G09G 5/10* (2006.01)
*G02F 1/1343* (2006.01)
*G02F 1/1333* (2006.01)

(52) U.S. Cl. .......................... 345/89; 345/690; 349/38; 349/85

(58) Field of Classification Search .................. 345/77, 345/87–104, 690; 349/38, 85
See application file for complete search history.

(56) References Cited

U.S. PATENT DOCUMENTS 5,465,102 A * 11/1995 Usui et al. .................... 345/89
5,844,533 A * 12/1998 Usui et al. .................... 345/89
6,501,451 B1 * 12/2002 Sakashita ..................... 345/87
6,556,180 B1 * 4/2003 Furuhashi et al. ............ 345/87
6,714,181 B1 * 3/2004 Furuhashi et al. ............ 345/89

FOREIGN PATENT DOCUMENTS

JP 04288589 A 10/1992
JP 05-273539 10/1993
JP 06-160891 6/1994
JP 06205341 A 7/1994
JP 06-265939 9/1994
JP 07-199149 8/1995

(Continued)

OTHER PUBLICATIONS

Japanese Office Action dated Dec. 7, 2004 and English translation thereof.

(Continued)

*Primary Examiner*—Xiao Wu
*Assistant Examiner*—M. Fatahiyar
(74) *Attorney, Agent, or Firm*—Harness, Dickey & Pierce P.L.C.

(57) ABSTRACT

A liquid crystal (LC) display device includes a LC panel and a driving circuit. The LC panel exhibits, in its voltage-transmittance characteristics, an extreme transmittance at a voltage equal to or lower than a lowest gray-level voltage. The driving circuit supplies to the LC panel a predetermined driving voltage overshooting a gray-level voltage corresponding to an input image signal of a current vertical period, according to a combination of an input image signal of an immediately preceding vertical period and the input image signal of the current vertical period.

18 Claims, 22 Drawing Sheets

FOREIGN PATENT DOCUMENTS

| | | |
|---|---|---|
| JP | 07-32587 | 12/1995 |
| JP | 7-325287 | 12/1995 |
| JP | 07-333617 | 12/1995 |
| JP | 08-248384 | 9/1996 |
| JP | 08-286176 | 11/1996 |
| JP | 09-080390 | 3/1997 |
| JP | 09-081083 | 3/1997 |
| JP | 10-039837 | 2/1998 |
| JP | 10-253942 | 9/1998 |
| JP | 11-326957 | 11/1999 |

OTHER PUBLICATIONS

Japanese Office Action dated Aug. 17, 2004 and English translation thereof.
U.S. Appl. No. 09/632,878.

* cited by examiner (INCLINATION ANGLE = 0 DEGREE)
(IN-PLANE RETARDATION = 0)

SMALL INCLINATION ANGLE LARGE

SMALL IN-PLANE RETARDATION LARGE

Cs/Clc≧1

LIQUID CRYSTAL DISPLAY DEVICE

This application is a continuation of U.S. patent application Ser. No. 09/820,021, filed 28 Mar. 2001, now abandoned entitled LIQUID CRYSTAL DISPLAY DEVICE.

BACKGROUND OF THE INVENTION

1. Field of the Invention

The present invention generally relates to a liquid crystal display device (LCD). More particularly, the present invention relates to an LCD preferably used for moving picture display.

2. Description of the Background Art

The LCDs are used for, e.g., personal computers, word processors, amusement equipments, television sets, and the like. Improvement in response characteristics of the LCDs has been studied for high-quality moving picture display.

Japanese Laid-Open Publication No. 4-288589 discloses an LCD having an increased response speed for intermediate-gray-scale display in order to reduce a residual image. In this LCD, an input image signal having its high-band components pre-enhanced is supplied to a liquid crystal display section so that the rise and fall speeds of the response are increased. Note that the "response speed" in the LCDs (liquid crystal panels) corresponds to an inverse number of the time required for the liquid crystal layer to reach an alignment state corresponding to the applied voltage (i.e., response time). The structure of a driving circuit of this LCD will be described with reference to FIG. 21.

The driving circuit of the aforementioned LCD includes an image storage circuit 61 for retaining at least one field image of an input image signal S(t), and a time-axis filter circuit 63 for detecting a variation in level of each picture element in the time-axis direction, based on the image signal retained in the storage circuit 61 and the input image signal S(t), and filtering the input image signal S(t) for high-band enhancement in the time-axis direction. The input image signal S(t) is a video signal decomposed into R (Red), G (Green) and B (Blue) signals. Since the R, G and B signals are subjected to the same processing, only one channel is shown herein.

The input image signal S(t) is retained in the image storage circuit 61 for storing an image signal of at least one field. A difference circuit 62 calculates the difference between respective picture-element signals of the input image signal S(t) and the image signal stored in the image storage circuit 61. Thus, the difference circuit 62 serves as a level variation detection circuit for detecting a variation in signal level during a single field. A difference signal Sd(t) in the time-axis direction from the difference circuit 62 is input together with the input image signal S(t) into the time-axis filter circuit 63.

The time-axis filter circuit 63 is formed from a weighting circuit 66 for weighting the difference signal Sd(t) with a weight coefficient $\alpha$ corresponding to the response speed, and an adder 67 for adding the weighted difference signal and the input image signal S(t) together. The time-axis filter circuit 63 is an adaptive filter circuit whose filter characteristics can be varied according to the output of the level variation detection circuit and the input level of each picture element of the input image signal. This time-axis filter circuit 63 enhances the input image signal S(t) in its high band in the time-axis direction.

The high-band enhanced signal thus obtained is converted into an alternating current (AC) signal by a polarity inversion circuit 64, and this AC signal is supplied to a liquid crystal display section 65. The liquid crystal display section 65 is an active-matrix liquid crystal display section including display electrodes (also referred to as picture-element electrodes) at the respective intersections of a plurality of data signal lines and a plurality of scanning signal lines crossing the same.

FIG. 22 is a signal waveform chart illustrating how the response characteristics are improved with this driving circuit. For simplicity of the description, it is herein assumed that the input image signal S(t) changes with a cycle period of one field, and the figure shows the case where the signal level rapidly changes in two fields. In this case, as shown in the figure, a change in the input image signal S(t) in the time-axis direction, i.e., the difference signal Sd(t), becomes positive for one field in response to the input image signal S(t) changing to positive, and becomes negative for one field in response to the input image signal S(t) changing to negative.

Basically, high-band enhancement can be achieved by adding the difference signal Sd(t) to the input image signal S(t). Actually, the relation between the respective degrees of change in the input image signal S(t) and in the transmittance depends on the response speed of the liquid crystal layer. Therefore, the weight coefficient $\alpha$ is determined so as to make correction within the range that does not cause any overshoot. As a result, a high-band enhanced high-band correction signal Sc(t) as shown in FIG. 22 is input to the liquid crystal display section, whereby optical response characteristics I(t) are improved as shown by the solid line over a conventional example shown by the dashed line.

In the case where the driving circuit as disclosed in the aforementioned publication is applied to a current LCD, response characteristics at a rise (a change to the display state corresponding to an increase in voltage applied to the liquid crystal layer) can be improved. However, the effect of improving the response characteristics at a fall (a change to the display state corresponding to a decrease in voltage applied to the liquid crystal layer) is relatively poor. In the LCD, a fall indicates a relaxation phenomenon that the liquid crystal molecules are restored from the orientation state corresponding to a first voltage toward that corresponding to a second voltage that is lower than the first voltage. The time required for the liquid crystal molecules to reach the orientation state corresponding to the second voltage (fall response time) mainly depends on the restoring force acting between the liquid crystal molecules. Accordingly, in the case where the voltage applied to the liquid crystal layer reduces from the first voltage to the second voltage, the fall response speed (or fall response time) of the liquid crystal layer generally does not so much depend on the magnitude of the second voltage (the difference from the first voltage). Therefore, the effect of increasing the fall response speed is poor even if the input image signal S(t) is emphasized.

It is now assumed that the lowest gray-level voltage (the lowest value of the gray-level voltage) is set to the value corresponding to the maximum transmittance in the LCD having such voltage-transmittance (V-T) characteristics as shown in FIG. 20 of the aforementioned Japanese Laid-Open Publication No. 4-288589 (corresponding to the V-T curve of 260-nm retardation in FIG. 5A of the present application). Particularly in this case, the fall response speed cannot be increased even if an overshoot voltage (a voltage lower than the lowest gray-level voltage) is applied. The reason for this is as follows: the orientation state of the liquid crystal molecules is substantially the same within a voltage region corresponding to the maximum transmittance (a flat region of the V-T curve). Therefore, the restoring force acting between the liquid crystal molecules is substantially the same whatever voltage within this region is applied.

As described above, the terms "rise" and "fall" as used in the specification correspond to a change in display state (or orientation state of the liquid crystal layer) according to an "increase" and "decrease" in voltage applied to the liquid crystal layer, respectively. A "rise", which is a change with an increase in applied voltage, corresponds to a "reduction in brightness" in the normally white mode (hereinafter, referred to as "NW mode") and to an "increase in brightness" in the normally black mode (hereinafter, referred to as "NB mode"). A "fall", which is a change with a decrease in applied voltage, corresponds to an "increase in brightness" in the NW mode and to a "reduction in brightness" in the NB mode. In other words, a "fall" is associated with the relaxation phenomenon of the orientation of the liquid crystal layer (liquid crystal molecules).

Moreover, the driving method disclosed in the aforementioned Japanese Laid-Open Publication No. 4-288589 has a problem that the input image signal S(t) capable of being subjected to effective high-band enhancement is limited. More specifically, the high-band correction signal Sc(t) cannot exceed a high-band limit signal (which is herein defined as a signal having the highest voltage among the input image signals S(t) that are input to the liquid crystal display section). Therefore, the input image signal can be subjected to high-band enhancement if the high-band correction signal Sc(t)≦the high-band limit signal. However, if the high-band correction signal Sc(t)>the high-band limit signal, a correction signal enough to cause a sufficient change in transmittance cannot be input to the liquid crystal display section. Accordingly, the response speed is increased at an intermediate gray level, but the effect of improving the optical response characteristics is reduced at a higher band level (as the voltage applied to the liquid crystal display section is increased).

The present invention is made in view of the aforementioned problems, and it is an object of the present invention to provide an LCD with improved fall response characteristics. It is another object of the present invention to provide an LCD with improved response characteristics at least at a high-band level.

SUMMARY OF THE INVENTION

A liquid crystal display device according to a first aspect of the present invention includes: a liquid crystal panel including a liquid crystal layer and an electrode for applying a voltage to the liquid crystal layer; and a driving circuit for supplying a driving voltage to the liquid crystal panel, wherein the liquid crystal panel exhibits, in its voltage-transmittance characteristics, an extreme transmittance at a voltage equal to or lower than a lowest gray-level voltage, and the driving circuit supplies to the liquid crystal panel a predetermined driving voltage overshooting a gray-level voltage corresponding to an input image signal of a current vertical period, according to a combination of an input image signal of an immediately preceding vertical period and the input image signal of the current vertical period. Thus, the object of the present invention, i.e., improved fall response characteristics, is achieved.

Preferably, a difference in retardation of the liquid crystal panel between a state where a voltage is not applied and a state where a highest gray-level voltage is applied is 300 nm or more.

Preferably, the liquid crystal panel is a transmission-type liquid crystal panel, and the extreme transmittance provides a maximum transmittance.

A single vertical period of the input image signal may correspond to a single frame, at least two fields of the driving voltage may correspond to a single frame of the input image signal, and the driving circuit may supply, at least in a first field of the driving voltage, a driving voltage overshooting a gray-level voltage corresponding to an input image signal of a current field to the liquid crystal panel.

Preferably, the liquid crystal layer is a homogeneous-orientation liquid crystal layer.

The liquid crystal panel may further include a phase compensator, three principal refractive indices na, nb and nc of an index ellipsoid of the phase compensator may have a relation of na=nb>nc, and the phase compensator may be arranged so as to cancel at least a part of retardation of the liquid crystal layer.

A liquid crystal display device according to a second aspect of the present invention includes: a liquid crystal panel including a plurality of picture-element capacitors arranged in a matrix, and thin film transistors respectively electrically connected to the plurality of picture-element capacitors; and a driving circuit for supplying a driving voltage to the liquid crystal panel, wherein the liquid crystal display device updates display every vertical period by rendering the plurality of picture-element capacitors in a charged state corresponding to the input image signal, each of the plurality of picture-element capacitors includes a liquid crystal capacitor formed from a corresponding picture-element electrode, a counter electrode and a liquid crystal layer provided between the picture-element electrode and the counter electrode, and a storage capacitor electrically connected in parallel with the liquid crystal capacitor, a capacitance ratio of the storage capacitor to the liquid crystal capacitor being 1 or more, and the picture-element capacitor retains 90% or more of a charging voltage over a single vertical period, when at least a highest gray-level voltage is applied. Thus, the object of the present invention, i.e., improved response characteristics at least at a high-band level, is achieved.

Preferably, the driving circuit supplies to the liquid crystal panel a predetermined driving voltage overshooting a gray-level voltage corresponding to an input image signal of a current vertical period, according to a combination of an input image signal of an immediately preceding vertical period and the input image signal of the current vertical period.

For the input image signal of every gray level, the driving circuit may supply to the liquid crystal panel the driving voltage overshooting the gray-level voltage corresponding to the input image signal of the current vertical period.

The liquid crystal layer of the liquid crystal panel may include a nematic liquid crystal material having a positive dielectric anisotropy, the liquid crystal layer included in each of the plurality of picture-element capacitors may include first and second regions having different orientation directions, and the liquid crystal panel may further include a pair of polarizers arranged so as to orthogonally cross each other with the liquid crystal layer interposed therebetween, and a phase compensator for compensating for a refractive index anisotropy of the liquid crystal layer in a black display state.

Alternatively, the liquid crystal layer may be a homogeneous-orientation liquid crystal layer.

Preferably, the liquid crystal panel further includes a phase compensator, three principal refractive indices na, nb and nc of an index ellipsoid of the phase compensator have a relation of na=nb>nc, and the phase compensator is arranged so as to cancel at least a part of retardation of the liquid crystal layer.

DETAILED DESCRIPTION OF THE PREFERRED EMBODIMENTS

Embodiment 1

Figure 1:
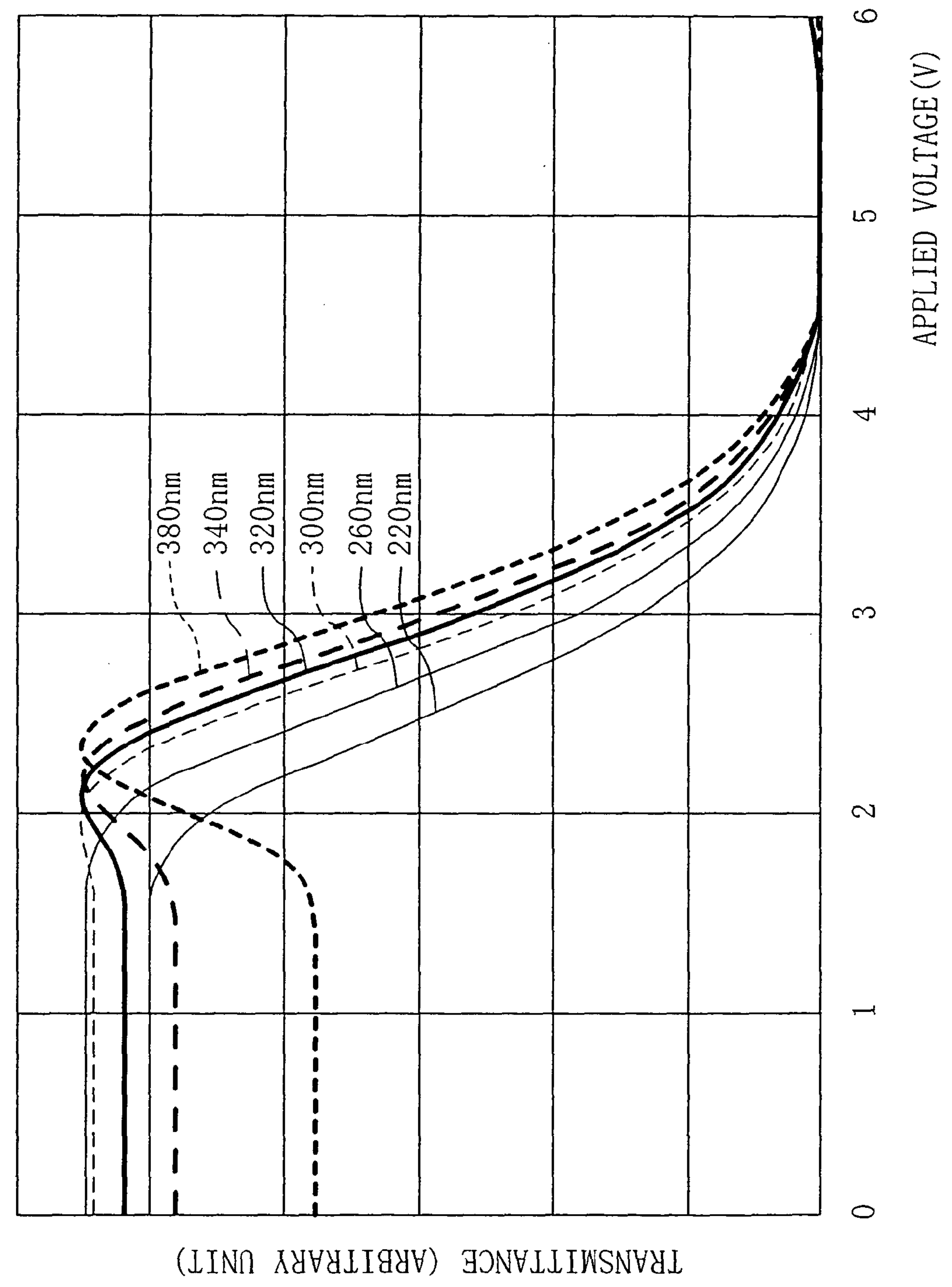
FIG. 1 is a graph showing V-T curves of a liquid crystal panel that includes a parallel-orientation liquid crystal layer including a liquid crystal material with a positive refractive index anisotropy ($\Delta n=n//-n\perp>0$).

Hereinafter, an embodiment of an LCD according to a first aspect of the present invention will be described with reference to the accompanying drawings. The present embodiment is herein exemplarily described regarding an NW mode LCD. However, the LCD according to the first aspect of the present invention is not limited to the NW mode LCD.

Functions of the LCD according to the first aspect of the present invention will now be described.

A liquid crystal panel of the LCD according to the first aspect of the present invention exhibits, in its V-T characteristics, an extreme transmittance at a voltage equal to or lower than the lowest gray-level voltage. An overshoot gray-level voltage is applied to the liquid crystal panel. Note that, the LCD is generally an AC-drive device, but the V-T characteristics thereof represent the relation between the absolute value of the voltage applied to the liquid crystal layer and the transmittance, based on a potential of the counter electrode.

In the specification, a voltage applied to the liquid crystal layer for display on the LCD is referred to as a gray-level voltage Vg, and the gray-level voltage Vg is herein denoted corresponding to the gray level of the display. For example, for 64-gray-scale display from zero (black) to 63 (white) gray levels, the gray-level voltage Vg for display of zero gray level is denoted with V0, and the gray-level voltage Vg for display of 63 gray level is denoted with V63. In the NW mode LCD exemplified in the embodiment, V0 is the highest gray-level voltage, and V63 is the lowest gray-level voltage. In contrast, in the NB mode LCD, V0 is the lowest gray-level voltage, and V63 is the highest gray-level voltage.

Hereinafter, a signal that provides image information to be displayed on the LCD is referred to as an input image signal S, and a voltage that is applied to a picture element according to a corresponding input image signal S is referred to as a gray-level voltage Vg. The input image signals of 64 gray levels (S0 to S63) correspond to the respective gray-level voltages (V0 to V63). However, the correspondence between the input image signal S (gray-level data) and the gray-level voltage Vg in the NW mode is opposite to that in the NB mode. The gray-level voltage Vg is set so that a transmittance (display state) corresponding to the respective input image signal S is attained when the liquid crystal layer receiving the respective gray-level voltage Vg reaches a steady state. This transmittance is referred to as a steady-state transmittance. It should be understood that the values of the gray-level voltages V0 to V63 may be varied depending on the LCDs.

For example, the LCD is driven by an interlace driving method, so that a single frame corresponding to a single image is divided into two fields, and a gray-level voltage Vg corresponding to the input image signal S is applied every field to the display section. It should be understood that a single frame may be divided into three or more fields, and the LCD may be driven by a non-interlace driving method. In the non-interlace driving, a gray-level voltage Vg corresponding to the input image signal S is applied every frame to the display section. A single field in the interlace driving or a single frame in the non-interlace driving is herein referred to as a single vertical period.

The overshoot voltage is detected based on the comparison between the respective input image signals S of the previous vertical period (immediately preceding vertical period) and the current vertical period. More specifically, in the case where the gray-level voltage Vg corresponding to the input image signal S of the current vertical period is lower than that corresponding to the input image signal S of the previous vertical period, the overshoot voltage refers to a voltage that is further lower than the gray-level voltage Vg corresponding to the input image signal of the current vertical period. On the contrary, in the case where the gray-level voltage Vg corresponding to the input image signal S of the current vertical period is higher than that corresponding to the input image signal S of the previous vertical period, the overshoot voltage refers to a voltage that is further higher than the gray-level voltage Vg corresponding to the input image signal S of the current vertical period.

The comparison of the input image signal S for detecting the overshoot voltage is made between the respective input image signals S of the previous vertical period and the current vertical period for every picture element. Even in the interlace driving in which image information corresponding to a single frame is divided into a plurality of fields, the input image signal S of a picture element of interest in the previous frame and the input image signals S of the upper and lower lines are used as supplementary signals, so that the signals corresponding to all the picture elements are applied within a single vertical period. Thus, the input image signals S of the previous and current fields are compared with each other.

The difference between an overshoot gray-level voltage Vg and a prescribed gray-level voltage (gray-level voltage corresponding to the input image signal S of the current vertical period) Vg is herein also referred to as an overshoot amount. In addition, the overshoot gray-level voltage Vg is herein also referred to as an overshoot voltage. The overshoot voltage may either be another gray-level voltage Vg having a prescribed overshoot amount with respect to the prescribed gray-level voltage Vg, or a voltage that is prepared in advance exclusively for overshoot driving (hereinafter, such a voltage is referred to as dedicated overshoot-driving voltage). At least a higher dedicated overshoot-driving voltage and a lower dedicated overshoot-driving voltage are respectively prepared as voltages overshooting the highest gray-level voltage (the gray-level voltage having the highest voltage value among the gray-level voltages) and the lowest gray-level voltage (the gray-level voltage having the lowest voltage value among the gray-level voltages).

The liquid crystal panel of the LCD according to the first aspect of the present invention has, in its V-T characteristics, an extreme transmittance at a voltage equal to or lower than the lowest gray-level voltage.

It is now assumed that the liquid crystal panel has an extreme transmittance at the lowest gray-level voltage. In this case, when a voltage overshooting the lowest gray-level voltage (lower dedicated overshoot-driving voltage) is applied, the transmittance goes through a value corresponding to the lowest gray-level voltage (in the NW mode, this value is the highest value among the transmittances used for display, and corresponds to the extreme transmittance, and in the NB mode, this value is the lowest value among the transmittances used for display, and corresponds to the extreme transmittance), and then reaches a value corresponding to the overshoot voltage (in the NW mode, this value is a lower transmittance, and in the NB mode, is a higher transmittance).

It is assumed that the lowest gray-level voltage is set to a value higher than the voltage corresponding to the extreme transmittance, and the voltage overshooting the lowest gray-level voltage (lower dedicated overshoot-driving voltage) is set to a value lower than the voltage corresponding to the extreme transmittance. When this lower dedicated overshoot-driving voltage is applied, the transmittance goes through a value corresponding to the lowest gray-level voltage (in the NW mode, this value is the highest value among the transmittances used for display, and in the NB mode, is the lowest value among the transmittances used for display), and through the extreme value, and then reaches a value corresponding to the overshoot voltage (in the NW mode, this value is a lower transmittance, and in the NB mode, is a higher transmittance).

It is assumed that the lowest gray-level voltage is set to a value higher than the voltage corresponding to the extreme transmittance, and the voltage overshooting the lowest gray-level voltage (lower dedicated overshoot-driving voltage) is set to a value equal to or higher than the voltage corresponding to the extreme transmittance. When this lower dedicated overshoot-driving voltage is applied, the transmittance goes through a value corresponding to the lowest gray-level voltage (in the NW mode, this value is the highest value among the transmittances used for display, and in the NB mode, is the lowest value among the transmittances used for display), and then reaches a value corresponding to the overshoot voltage (in the NW mode, this value is a higher transmittance, and in the NB mode, is a lower transmittance).

The response time required for a fall (to the steady state) is almost the same both in the case of applying the lowest gray-level voltage and applying the overshoot voltage. Therefore, application of the overshoot voltage can reduce the time for the transmittance to reach a value corresponding to the lowest gray-level voltage. In other words, in a liquid crystal panel that exhibits an extreme transmittance at a voltage equal to or lower than the lowest gray-level voltage, the liquid crystal molecules in the liquid crystal layer with application of the lowest gray-level voltage has a substantially different orientation state from that without application of a voltage. Therefore, further relaxation is possible. Thus, the transmittance changes more steeply with time as compared to the case of overshoot-driving a liquid crystal panel having such V-T characteristics that exhibit a constant transmittance (i.e., having no extreme value) over the voltage range of the lowest gray-level voltage or less (See FIGS. 5A and 5B).

Therefore, in the LCD according to the first aspect of the present invention, the fall response characteristics of the LCD can be improved over the conventional overshoot driving. Note that, even if a liquid crystal panel that exhibits no extreme transmittance in the lower voltage range is used, it is possible to improve the fall response characteristics by setting the lowest gray-level voltage to a value that is somewhat higher than the voltage corresponding to the highest transmittance (NW mode) or the lowest transmittance (NB mode). However, such a somewhat higher lowest gray-level voltage reduces the transmittance range available for the display. In contrast, in the LCD according to the first aspect of the present invention, the lowest gray-level voltage is set to a value equal to or higher than the voltage corresponding to an extreme transmittance (maximal transmittance (NW mode) or minimal transmittance (NB mode)). Accordingly, the fall response speed can be improved while suppressing or preventing the transmittance loss.

Particularly in the case where the lowest gray-level voltage is set to a value corresponding to the extreme transmittance, there is no transmittance loss. Note that, in order to enhance the effect of improving the response speed, it is preferable to set the lowest gray-level voltage to a value higher than that corresponding to the extreme transmittance. Even if the lowest gray-level voltage is set as such, the transmittance loss can be reduced as compared to the case of the liquid crystal panel exhibiting no extreme value in the lower voltage range. The reason for this is as follows: in the LCD according to the first aspect of the present invention, the liquid crystal layer with application of the voltage corresponding to the extreme transmittance has a substantially different orientation state from that without application of a voltage. Therefore, further relaxation is possible. Thus, the relaxation phenomenon from the extreme transmittance to the transmittance without application of the voltage can be utilized for the fall response.

It should be understood that the rise response speed of the liquid crystal layer increases as the applied voltage value is higher. Therefore the rise response characteristics can also be improved by application of an overshoot voltage.

Note that the liquid crystal panel that exhibits, in its V-T characteristics, an extreme transmittance at a voltage equal to or lower than the lowest gray-level voltage is implemented by, e.g., adjusting the retardation of the liquid crystal panel.

Unless otherwise specified, in the NW mode, “retardation of the liquid crystal panel” as used in the specification means the sum of a retardation of the liquid crystal layer in the state where a voltage is not applied and a retardation of a phase compensator, and indicates the retardation to the light incident vertically to the display plane of the liquid crystal panel (which is in parallel with the plane of the liquid crystal layer). It should be understood that, in the structure including no phase compensator, the retardation of the liquid crystal panel corresponds to the retardation of the liquid crystal layer in the state where a voltage is not applied. In the NB mode, “retardation of the liquid crystal panel” means the sum of the retardation of the liquid crystal layer in the state where the maximum possible voltage for the display is applied and the retardation of a phase compensator, and indicates the retardation to the light incident vertically to the display plane of the liquid crystal panel. In the structure including no phase compensator, the retardation of the liquid crystal panel corresponds to the retardation of the liquid crystal layer in the state where the maximum possible voltage for the display is applied. The retardation of the liquid crystal layer is the difference (Δn) between the maximum and minimum refractive indices of a liquid crystal material multiplied by the thickness (d) of the liquid crystal layer.

In general, the retardation of a transmission-type liquid crystal panel is set so as to change in the range of about 260 nm in response to application of a gray-level voltage. In other words, the retardation of the liquid crystal panel is set so that the difference in retardation of the liquid crystal panel between the lowest- and highest-gray-level display states is about 260 nm. This is determined so as to increase the contrast ratio for the green light having the highest human eye’s color sensitivity (i.e., the light having a wavelength of about 550 nm), as well as in view of the display characteristics (viewing-angle dependency) for the other colors. Depending on the specification of the LCD, the retardation is set within the range of about 250 nm to about 270 nm. Hereinafter, “260 nm” is used as a typical preset retardation value.

Since the orientation state of the liquid crystal molecules changes in response to a voltage, the retardation of the liquid crystal layer changes according to the voltage. However, the liquid crystal layer has a layer anchored at the substrate surface, i.e., a layer whose orientation state does not change in response to application of a voltage (in the voltage range used for normal display) (hereinafter, such a layer is referred to as “anchoring layer”). The retardation of the anchoring layer is about 40 nm to about 80 nm. Accordingly, the overall retardation of the liquid crystal layer is the retardation of the anchoring layer added to the aforementioned preset value (about 260 nm) (about 300 nm to about 340 nm).

A phase compensator for compensating for the retardation of the anchoring layer (e.g., a phase plate or phase film) may be provided. More specifically, a phase compensator may be provided which makes the total retardation of the liquid crystal layer and the phase compensator equal to the aforementioned preset value (about 260 nm).

In the LCD according to the first aspect of the present invention, it is preferable that the difference in retardation of the liquid crystal panel between the states where no voltage is applied and where the highest gray-level voltage is applied (hereinafter, such a difference is also simply referred to as “the retardation difference of the liquid crystal panel”) is 300 nm or more. Provided that the retardation of the liquid crystal panel is set so as to change by 300 nm or more throughout the voltage range up to the highest gray-level voltage, about 260 nm can be ensured as a retardation range used for display, and also the V-T characteristics that provide an extreme transmittance at a voltage equal to or lower than the lowest gray-level voltage can be implemented. It should be understood that, in the structure making much account of the response speed, the retardation range used for display may be reduced.

The effect of improving the fall response characteristics of the LCD according to the first aspect of the present invention can be observed particularly in the NW mode liquid crystal panel. Therefore, it is preferable to apply the present invention to the NW mode LCD. In the case where the present invention is applied to an NB mode liquid crystal panel including a horizontal orientation liquid crystal layer and also using a phase compensator, an extreme (minimal) transmittance appears in the black display, and therefore is not likely to be observed. Moreover, around the extreme transmittance in the black display, even a slight difference in gray-level voltage results in a large difference in a retardation value. Therefore, it is difficult to compensate for the phase difference so as to provide excellent black display. In the case where the present invention is applied to an NB mode liquid crystal panel including a vertical orientation liquid crystal layer, no extreme transmittance is observed in the black display. Therefore, the effect of reducing the response time is not obtained.

Moreover, a parallel-orientation (homogeneous-orientation) liquid crystal layer has a faster response speed (e.g., response time of about 17 msec) than that of a twisted orientation liquid crystal layer and a vertical orientation liquid crystal layer. Therefore, by applying the LCD according to the first aspect of the present invention to the parallel-orientation liquid crystal layer, further improvement in response speed is obtained, making it possible to implement an LCD having particularly excellent moving picture display characteristics (e.g., response time of about 10 msec or less).

(Retardation) The NW mode liquid crystal panel included in the LCD of the present embodiment is adjusted in retardation so as to exhibit, in its V-T characteristics, the maximal (and highest) transmittance at a voltage equal to or lower than the lowest gray-level voltage. Typically, the liquid crystal panel is set such that the retardation changes in the range of 300 nm or more in response to application of a voltage.

The reason for this will be described with reference to FIGS. 1, 2A and 2B.

Figure 2A:
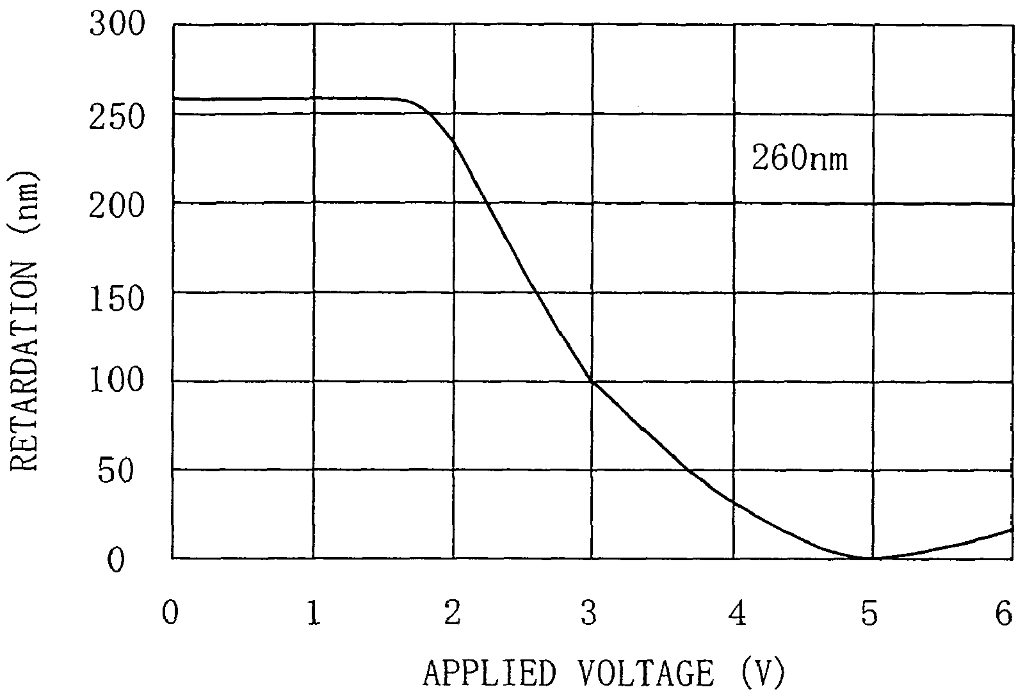
FIG. 2A is a graph showing a voltage-retardation curve of a liquid crystal panel having a retardation of 260 nm.
Figure 2B:
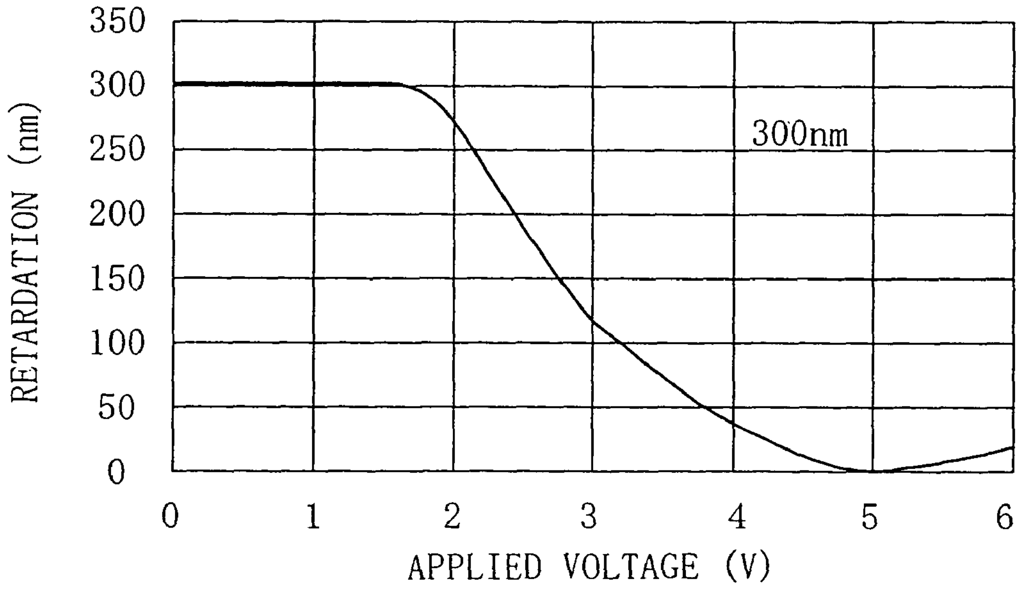
FIG. 2B is a graph showing a voltage-retardation curve of a liquid crystal panel having a retardation of 300 nm.

A V-T curve of the liquid crystal panel that includes a parallel-orientation liquid crystal layer including a liquid crystal material with a positive refractive index anisotropy ($\Delta n = n// - n\perp > 0$) is shown in FIG. 1. FIG. 1 also shows V-T curves of the liquid crystal panels having different retardations. FIG. 2A shows a voltage-retardation curve of the liquid crystal panel having a retardation of 260 nm, and FIG. 2B shows a voltage-retardation curve of the liquid crystal panel having a retardation of 300 nm. In the graphs showing the curves representing the transmittance or retardation changing according to an applied voltage, the ordinate indicates a relative value (arbitrary unit) of the transmittance or retardation, regarding the lowest transmittance or retardation as zero. Accordingly, these graphs show a variation in transmittance or retardation according to a change in applied voltage.

The liquid crystal panels having various retardations shown in FIG. 1 can be obtained by using liquid crystal materials having different values $\Delta n$ and/or by changing the thickness d of the liquid crystal layer. The retardation value can also be adjusted using a phase compensator.

First, regarding the liquid crystal layer with the anchoring layer removed, the relation between the alignment state of the liquid crystal molecules and the retardation will be described. When the voltage is applied to the parallel-orientation liquid crystal layer, the liquid crystal molecules are raised (tilted) with respect to the surface of the liquid crystal layer), so that the maximum refractive index for the light incident vertically to the liquid crystal layer becomes smaller than n// (the minimum refractive index is retained at $n\perp$). Accordingly, as shown in FIGS. 2A and 2B, the retardation is reduced upon application of the voltage. When the applied voltage is increased (a voltage equal to or higher than the saturation voltage is applied), the liquid crystal molecules are oriented vertically to the surface of the liquid crystal layer. Therefore, both the maximum and minimum refractive indices of the liquid crystal layer become equal to $n\perp$, so that the retardation is reduced to zero. However, since an actual liquid crystal layer has an anchoring layer, the retardation is not reduced to zero. FIGS. 2A and 2B each shows a voltage-retardation curve of the liquid crystal panel provided with a phase compensator for compensating for the retardation of the anchoring layer. Herein, the retardation of the liquid crystal layer at an applied voltage of 5 V is cancelled.

In general, the liquid crystal panel is set to have the highest transmittance when the retardation thereof is about 260 nm (250 to 270 nm). Accordingly, in the case where the retardation without voltage application is about 260 nm or less (see the curves of 220 nm and 260 nm in FIG. 1), the transmittance gradually monotonously reduces with increase in voltage from the state where the voltage is not applied. In contrast, in the case where the retardation without voltage application exceeds about 260 nm (see the curves of 300 nm, 320 nm, 340 nm and 380 nm in FIG. 1), the transmittance first gradually increases (until the retardation reaches about 260 nm) and then reduces with increase in voltage.

Since the retardation of the liquid crystal panel (variation caused by the voltage) is set to 300 nm or more, the transmittance reaches the highest (maximal) value at the applied voltage to the liquid crystal layer higher than 0 V. Thus, the lowest gray-level voltage Vg (e.g., V63) is set to a value equal to or higher than this voltage, and also a voltage lower than this voltage is applied as an overshoot voltage, so that the overshoot toward a lower voltage can be effectively conducted.

(Dedicated Overshoot-Driving Voltage and Gray-Level Voltage)

In the NW mode, the lowest gray-level voltage Vg of the LCD according to the first aspect of the present invention is set to a value equal to or higher than the voltage corresponding to the highest steady transmittance. The highest gray-level voltage Vg is set to a value equal to or lower than the voltage corresponding to the lowest steady transmittance. Note that, in the NB mode, the lowest gray-level voltage Vg is set to a value equal to or higher than the voltage corresponding to the lowest steady transmittance, and the highest gray-level voltage Vg is set to a value equal to or lower than the voltage corresponding to the highest steady transmittance.

The LCD according to the first aspect of the present invention has a retardation difference of, e.g., about 300 nm or more. Therefore, as shown in FIG. 1, the voltage corresponding to the highest transmittance in the V-T curve of the NW mode LCD is a voltage that provides an extreme value. Thus, if the gray-level voltage Vg is set to the range including a voltage lower than the voltage providing the extreme value, the transmittance is inversed, whereby gray-level inversion is observed. In order to prevent this gray-level inversion, the lowest gray-level voltage is set to a value equal to or higher than the voltage providing the extreme value. It should be appreciated that the highest gray-level voltage Vg is set so as not to exceed the withstand voltage of a driving circuit (a driver, and typically a driver IC (Integrated Circuit)).

In the LCD according to the first aspect of the present invention, a dedicated overshoot-driving voltage Vos is preset in addition to the gray-level voltage Vg (V0 to V63). The dedicated overshoot-driving voltage Vos includes a voltage Vos(L) lower than the gray-level voltage Vg and a voltage Vos(H) higher than the gray-level voltage Vg. A plurality of voltage values may be prepared for each of Vos(L) and Vos(H). The higher dedicated overshoot-driving voltage Vos(H) (the highest value if a plurality of voltages Vos(H) are prepared) is set so as not to exceed the withstand voltage of the driving circuit. The dedicated overshoot-driving voltage Vos is set such that the voltage Vos combined with the gray-level voltage Vg (V0 to V63) does not exceed the number of bits of the driving circuit.

Figure 3:
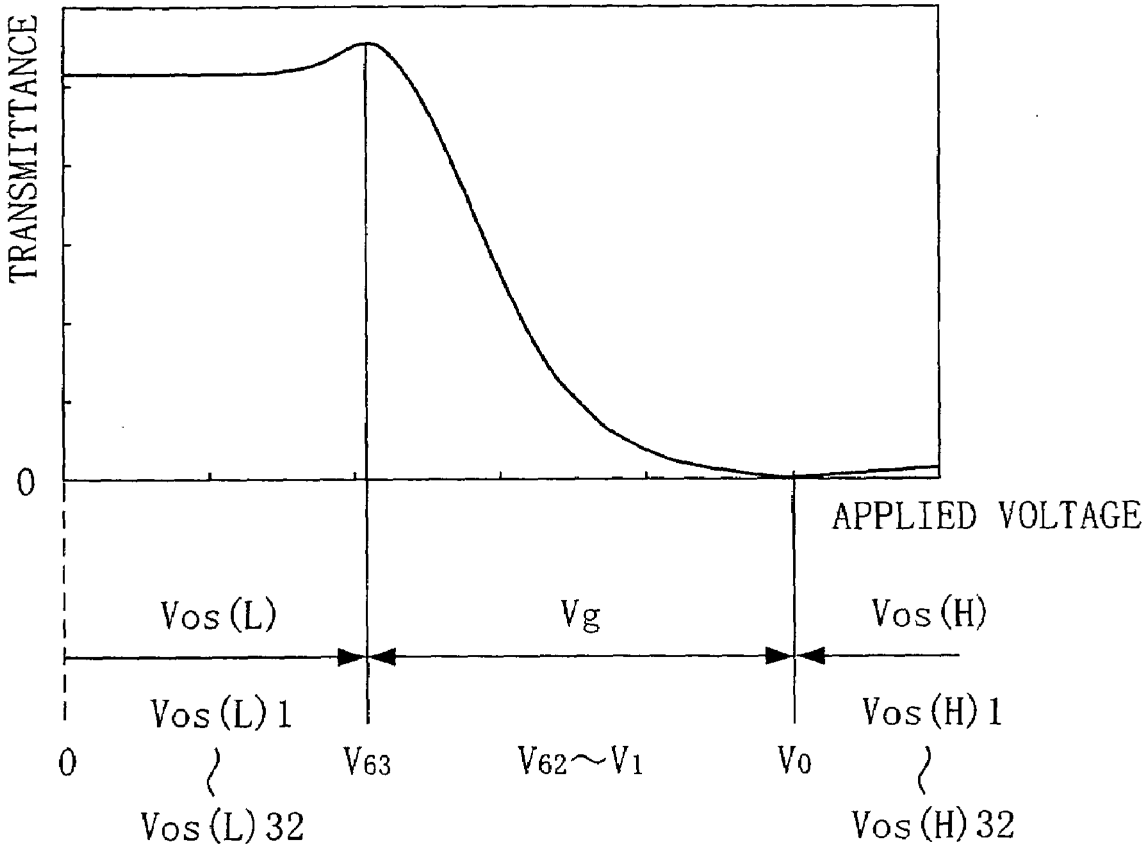
FIG. 3 is a schematic diagram showing the relation between a V-T curve, dedicated overshoot-driving voltage Vos and gray-level voltage Vg in a liquid crystal panel included in an LCD according to an embodiment of the present invention.

Hereinafter, setting of the dedicated overshoot-driving voltage Vos and the gray-level voltage Vg will be specifically described with reference to FIG. 3. FIG. 3 shows the relation between a V-T curve, dedicated overshoot-driving voltage Vos and gray-level voltage Vg. The gray-level voltage Vg (V0 (black) to V63) is set within the range from the voltage corresponding to the highest transmittance to the voltage corresponding to the lowest transmittance. The lower dedicated overshoot-driving voltage Vos(L) (e.g., 32 gray levels Vos(L)1 to Vos(L)32) is set within the range from 0 V to a voltage lower than V63 (the lowest gray-level voltage Vg). The higher dedicated overshoot-driving voltage Vos(H) (e.g., 32 gray levels Vos(H)1 to Vos(H)32) is set within the range from a voltage higher than V0 (the highest gray-level voltage Vg) to a voltage that does not exceed the withstand voltage of the drive circuit. Note that the number of gray levels of the gray-level voltage Vg as well as the number of gray levels of the dedicated overshoot-driving voltage Vos can be set arbitrarily so as not to exceed the number of bits of the driving circuit. The number of gray levels of the lower dedicated overshoot-driving voltage Vos(L) may be different from that of the higher dedicated overshoot-driving voltage Vos(H).

The voltage applied to conduct the overshoot driving is predetermined corresponding to a change in input image signal S, and either the gray-level voltage Vg or the dedicated overshoot-driving voltage Vos is used.

For example, in the case where the gray-level voltage Vg corresponding to the input image signal S of the current field is lower than that corresponding to the input image signal S of the previous field, a voltage that is lower than the gray-level voltage Vg corresponding to the input image signal S of the current field is selected from the gray-level voltage Vg and the lower dedicated overshoot-driving voltage Vos(L), and applied to the liquid crystal panel. A voltage used for overshoot driving is predetermined so as to attain a steady state transmittance corresponding to the input image signal S of the current field within a predetermined time (e.g., 16.7 msec) from application of the voltage of the current field. Alternatively, the voltage used for overshoot driving is predetermined so as to attain such a transmittance that does not provide uniform display when visually observed.

The voltage used for overshoot driving is determined for a combination of the input image signal S (e.g., 64 gray levels) of the previous field and the input image signal S of the current field (64 gray levels) (however, this voltage is not necessary for the combination having no change in gray level). Depending on the response speed of the liquid crystal panel, there may be a combination of the gray levels that does not require the overshoot driving. The number of gray levels of the dedicated overshoot-drive voltage Vos may also be varied as appropriate.

(Circuit for Conducting Overshoot Driving)

The structure of a driving circuit 10 in the LCD of the present embodiment will now be described with reference to FIG. 4.

The driving circuit 10 receives an external input image signal S, and supplies a corresponding driving voltage to a liquid crystal panel 15. The driving circuit 10 includes an image storage circuit 11, a combination detection circuit 12, an overshoot voltage detection circuit 13, and a polarity inversion circuit 14.

The image storage circuit 11 retains at least one field image of the input image signal S. It should be understood that, in the case where a single frame is not divided into a plurality of fields, the image storage circuit 11 retains at least one frame image. The combination detection circuit 12 compares the input image signal S of the current field with the input image signal S of the previous field retained in the image storage circuit 11, and outputs a signal indicating that combination to the overshoot voltage detection circuit 13. The overshoot voltage detection circuit 13 detects a driving voltage corresponding to the combination detected by the combination detection circuit 12, from the gray-level voltage Vg and the dedicated overshoot-drive voltage Vos. The polarity inversion circuit 14 converts the driving voltage detected by the overshoot voltage detection circuit 13 into an AC signal for supply to the liquid crystal panel (display section) 15.

Hereinafter, the input/output signal of each circuit will be described. In the following description, it is assumed that a voltage used for fall overshoot driving is preset to a gray-level voltage Vg that is lower than the gray-level voltage Vg corresponding to the input image signal S.

First, the image storage circuit 11 retains the input image signal S corresponding to one field before the input image signal S of the current field.

Then, the combination detection circuit 12 detects, for every picture element, a combination of the current input image signal S and the input image signal S of the previous field retained in the image storage circuit 11. For example, for a given picture element, the combination detection circuit 12 detects a combination (S20, S40) of the input image signal S20 of the previous field and the input image signal S40 of the current field.

The overshoot voltage detection circuit 13 detects a gray-level voltage V60 (corresponding to an input image signal S60) that is predetermined for the combination (S20, S40) detected by the combination detection circuit 12, and supplies the gray-level voltage V60 to the polarity inversion circuit 14 as a driving voltage. This operation corresponds to conversion of the input image signal S40 of the current field into S60. For example, the process of detecting the gray-level voltage V60 as a predetermined overshoot voltage corresponding to the combination (S20, S40) detected by the combination detection circuit 12 may be conducted either by a lookup table method or by performing a predetermined operation.

Finally, the polarity inversion circuit 14 converts the gray-level voltage V60 to an AC signal for supply to the liquid crystal panel 15.

Hereinafter, the operation of conducting the overshoot driving using the dedicated overshoot-driving voltage Vos in the LCD of the present embodiment will be described.

For example, for a 64-gray-level (6-bit) input image signal S, the overshoot voltage detection circuit 13 can detect a driving voltage for prescribed overshoot driving, from 7 bits (64 gray-level voltages Vg (V0 to V63) and 64 overshoot voltages Vos (higher voltages: Vos(H)1 to Vos(H)32; and lower voltages: Vos(L)1 to Vos(L)32).

This will be specifically described for a fall. It is now assumed that the input image signal S40 is shifted to S63 after one field. The input image signal S40 is retained in the image storage circuit 11. The combination detection circuit 12 detects the combination (S40, S63). Then, the overshoot voltage detection circuit 13 detects a dedicated overshoot-driving voltage Vos(L)20 predetermined so as to attain a steady transmittance corresponding to the input image signal S63 within one field, and supplies the voltage Vos(L)20 to the polarity inversion circuit 14 as a driving voltage. This voltage Vos(L)20 is converted into an AC signal by the polarity inversion circuit 14 and then supplied to the liquid crystal panel.

The above operation corresponds to conversion of a 6-bit digital input image signal S into a 7-bit digital input image signal S including a dedicated overshoot-driving voltage Vos (64 gray levels) by the overshoot voltage detection circuit 13.

Note that, when there is no change between the input image signals S, an overshoot driving voltage is not applied. For example, when the combination detection circuit 12 detects the combination (S40, S40), the overshoot voltage detection circuit 13 outputs a gray-level voltage V40 corresponding to S40 to the polarity inversion circuit 14 as a driving voltage.

A field to be subjected to the aforementioned overshoot driving is not limited to the first field to which the input image signal S is shifted. In addition to the first field, the following field or the field after the following field may be subjected to the overshoot driving. Such a driving method may be conducted with a combination of appropriate circuits. Note that, in the case where a single frame is divided into a plurality of fields for driving, it is preferable that the first field or all the fields are subjected to the overshoot driving. Moreover, in the case where a plurality of fields within a single frame are subjected to the overshoot driving, the overshoot amounts (that is, shift amounts from a predetermined gray-level voltage Vg) used in the respective fields may be different from each other. For example, overshoot driving of the second field may be conducted with an overshoot amount smaller than that used in overshoot driving of the first field.

(Change in Transmittance in Overshoot Driving)

Hereinafter, response characteristics upon overshoot-driving the LCD of the present embodiment will be described with reference to FIGS. 5A and 5B.

Figure 5A:
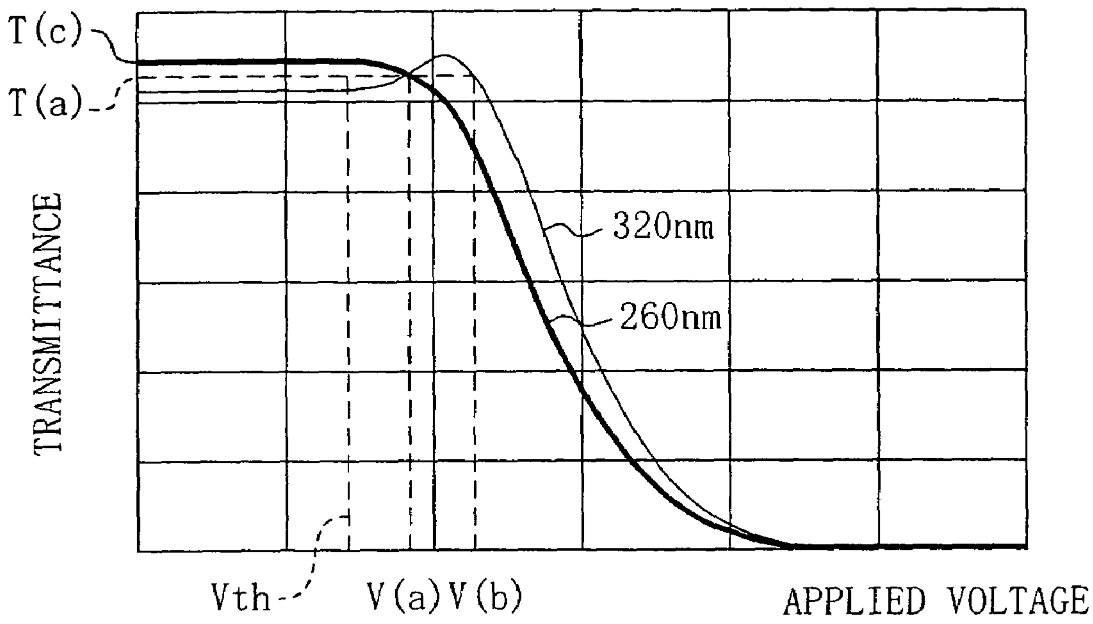
FIG. 5A is a graph showing the respective V-T curves of the LCD according to the embodiment of the present invention (liquid crystal panel with 320-nm retardation) and an LCD of a comparative example (liquid crystal panel with 260-nm retardation), and also showing the conditions of setting the lowest gray-level voltage.

FIG. 5A shows the respective V-T curves of the LCD of the present embodiment (liquid crystal panel with 320-nm retardation) and the LCD of a comparative example (liquid crystal panel with 260-nm retardation). The liquid crystal panel of the present embodiment has an extreme value in the V-T curve, whereas the liquid crystal panel of the comparative example does not have an extreme value in the V-T curve. The respective liquid crystal layers of these two liquid crystal panels have the same thickness, and the respective liquid crystal materials used therein have the same dielectric anisotropy ($\Delta\epsilon$) and viscosity, and have different values $\Delta n$. The retardation is adjusted with a phase compensator. In these liquid crystal panels, substantial change in retardation starts at the same voltage (Vth). As the applied voltage is gradually increased from a lower voltage, the transmittance of the 260-nm liquid crystal panel decrease monotonously beyond Vth, whereas the transmittance of the 320-nm liquid crystal panel first increases beyond Vth, reaches the extreme value and then degreases monotonously. In both liquid crystal panels, the highest transmittance is T(c), and the steady transmittance for the applied voltage V(a) is T(a).

Figure 5B:
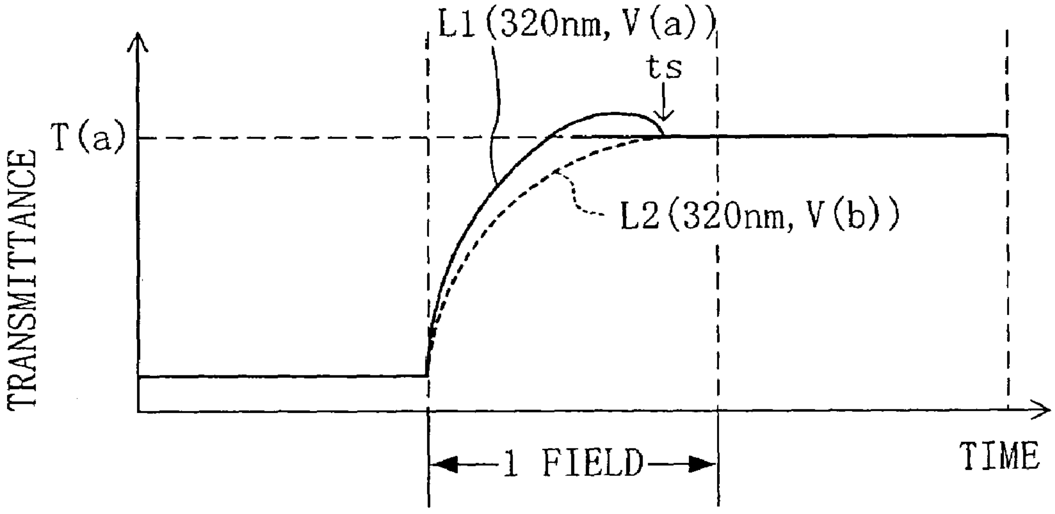
FIG. 5B is a graph schematically showing a change in transmittance with time in the LCD according to the embodiment of the present invention.

FIG. 5B is a graph schematically showing a change in transmittance with time in the LCD of the present embodiment. A time interval shown by the dashed line in FIG. 5B corresponds to a single field. FIG. 5B shows a change from a first field of the black display (corresponding to the lowest gray level S0) to a second field of the white display (corresponding to the highest gray level S63). In FIG. 5B, the transmittance attains a steady state at the same time ts. As described before, this is because a fall in the LCD corresponds to the relaxation phenomenon of the orientation of the liquid crystal molecules.

Curve L1 in FIG. 5B shows the case where the voltage V(a), i.e., a lower dedicated overshoot-driving voltage Vos, was applied to the liquid crystal panel with 320-nm retardation in the second field (the present invention). In contrast, curve L2 shows the case where the lowest gray-level voltage V(b) corresponding to the same steady-state transmittance as in the case of the dedicated overshoot-driving voltage V(a) was applied to the liquid crystal panel with 320-nm retardation. For simplicity of comparison, the voltage corresponding to the same transmittance as that of the lowest gray-level voltage V(b) was used as the dedicated overshoot-driving voltage V(a). However, setting of the dedicated overshoot-driving voltage V(a) is not limited to this.

As shown by curve L1, when the lower dedicated overshoot-driving voltage V(a) is applied, the transmittance first increases from the value of the first field, and then decreases toward the steady state transmittance of the dedicated overshoot-driving voltage V(a), as long as a single field is long enough.

This is due to a change in retardation of the liquid crystal panel of the present embodiment. In response to application of the dedicated overshoot-driving voltage V(a), the liquid crystal molecules fall toward the steady state. It should be appreciated that the retardation of the liquid crystal layer increases toward the steady state corresponding to the applied dedicated overshoot-driving voltage V(a). More specifically, the retardation first increases, and still increases beyond 260 nm. Then, the retardation gets close to a steady retardation corresponding to the applied dedicated overshoot-driving voltage V(a). In general, the retardation corresponding to the highest transmittance is about 260 nm. Therefore, the transmittance first increases and then decreases, whereby the change in transmittance as described above is obtained (see FIG. 5A).

On the other hand, as shown by curve L2, when merely the lowest gray-level voltage V(b) is applied instead of V(a) (i.e., when the overshoot driving is not conducted), the transmittance increased from the value of the first field toward the steady state transmittance corresponding to the lowest gray-level voltage V(b). In response to application of the gray-level voltage V(b), the liquid crystal molecules fall toward the steady state. It should be appreciated that the retardation increases toward the steady state of the applied voltage V(b). In this case, the retardation does not exceed about 260 nm (the retardation that provides an extreme transmittance). Therefore, reduction in transmittance does not occur.

Note that, when the voltage V(a) is applied to the liquid crystal panel of 260-nm retardation, the response characteristics change approximately in the same manner as that of curve L2. When a voltage (overshoot voltage) that is even lower than V(a) (the lowest gray-level voltage) is applied to the liquid crystal panel of 260-nm retardation, the response time is further reduced but only to a small extent. Therefore, a steeper response curve than curve L1 is not obtained.

As can be appreciated from the above, in the case where the dedicated overshoot-driving voltage V(a) is applied to a liquid crystal panel having a retardation of 300 nm or more, the transmittance increases extremely steeply in the second field, as shown by curve L1. According to the present embodiment, the fall response characteristics are improved by utilizing such a steep change in transmittance, whereby an LCD preferably used for moving picture display is provided.

Figure 5C:
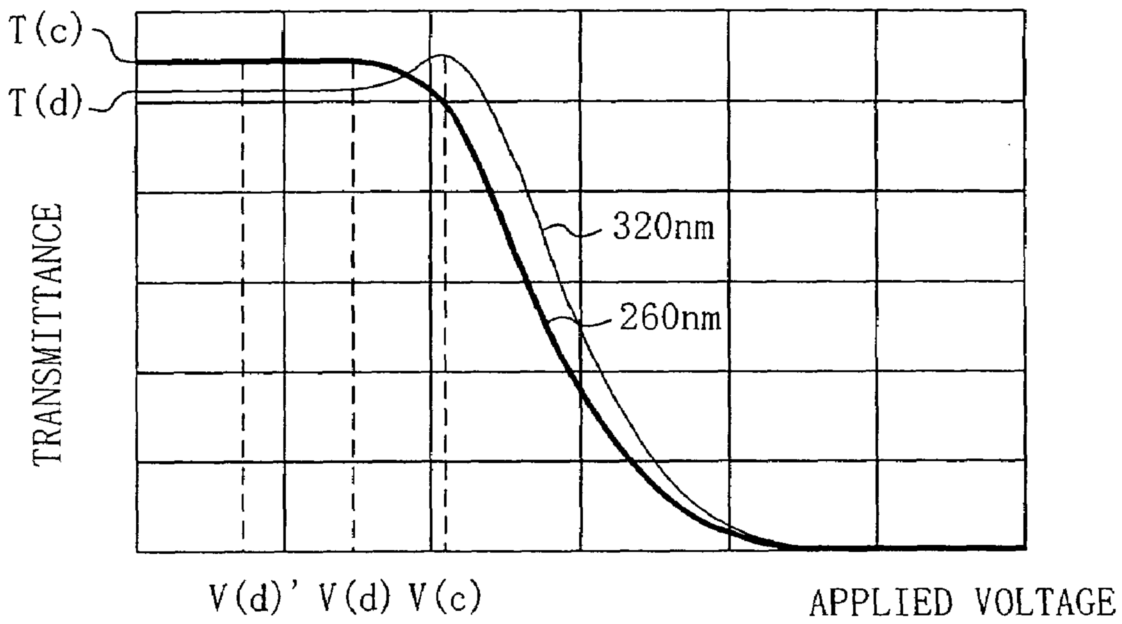
FIG. 5C is a graph showing the respective V-T curves of the LCD according to the embodiment of the present invention (liquid crystal panel with 320-nm retardation) and an LCD of a comparative example (liquid crystal panel with 260-nm retardation), and also showing the conditions of setting the lowest gray-level voltage.

Hereinafter, response characteristics of the LCD of the present embodiment (liquid crystal panel with 300-nm retardation) will be described with reference to FIG. 5C. As shown in FIG. 5C, for this LCD, the lowest gray-level voltage was set to a voltage (V(c)) corresponding to the highest transmittance (T(c)), and overshoot driving was conducted (a voltage (V(d)) was applied). For comparison, response characteristics of a liquid crystal panel that does not have an extreme value in its V-T curve (liquid crystal panel with 260-nm retardation) are also described. For this liquid crystal panel, the lowest gray-level voltage was set to a voltage (V(d)) corresponding to the highest transmittance (T(c)), and overshoot driving was conducted (a voltage V(d') was applied).

Figure 5D:
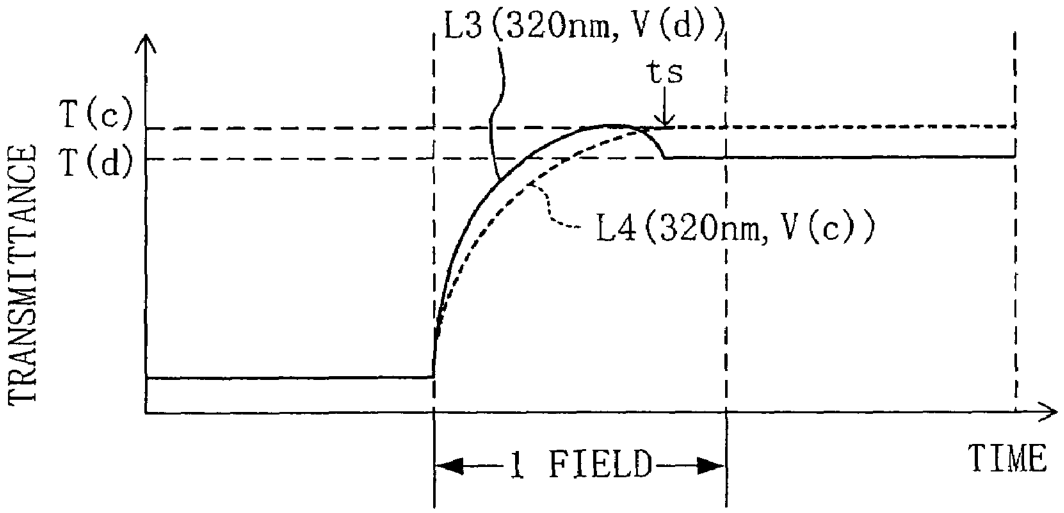
FIG. 5D is a graph schematically showing a change in transmittance with time in the LCD according to the embodiment of the present invention.

FIG. 5D shows response curves L3 and L4 of the liquid crystal panel with 320-nm retardation. Response curve L3 shows the case where the lowest gray-level voltage was set to the voltage (V(c)) corresponding to the highest transmittance (T(c)), and overshoot driving was conducted (the voltage (V(d)) was applied). Response curve L4 shows the case where the lowest gray-level voltage V(c) was applied without conducting the overshoot driving.

As is apparent from the comparison between curves L3 and L4 of FIG. 5D, even when the lowest gray-level voltage is set to the voltage V(c) corresponding to the highest transmittance in the liquid crystal panel with 320-nm retardation, the fall response characteristics can be improved by application of the overshoot voltage V(d), as in the case described above in connection with FIG. 5B. The reason for this is as follows: in the V-T curve of the 320-nm liquid crystal panel, the point that provides the highest transmittance is a maximal value, and a further change in retardation, i.e., further relaxation of orientation of the liquid crystal molecules, is still possible in the voltage range lower than V(c). However, an application period of the overshoot voltage V(d) must be adjusted so that the transmittance does not decrease from the highest value.

Note that, as described above, setting the lowest gray-level voltage to the voltage V(c) corresponding to the highest transmittance allows the response characteristics to be improved without sacrificing the transmittance. However, a greater effect of improving the response characteristics is obtained when the lowest gray-level voltage is set to a value higher than the voltage corresponding to the extreme transmittance, as shown in FIG. 5B. Accordingly, depending on applications of the LCD, and the like, the lowest gray-level voltage can be set to a value equal to or higher than the voltage corresponding to the extreme transmittance.

On the other hand, as shown in FIG. 5C, when the lowest gray-level voltage is set to the voltage providing the highest transmittance in the liquid crystal panel with 260-nm retardation, the response characteristics cannot be improved even by application of the dedicated overshoot-driving voltage V(d') less than the lowest gray-level voltage. In other words, whether the lowest gray-level voltage V(d) or the overshoot voltage V(d') is applied, the resultant response curve is approximately the same as curve L4 of FIG. 5D. The reason for this is as follows: as described before, in the flat portion of the 260-nm curve, the liquid crystal molecules have substantially the same orientation state and thus have the same restoring force. Accordingly, in order to improve the fall response characteristics of the liquid crystal panel with 260-nm retardation, the lowest gray-level voltage must be set to a value (e.g., V(c)) higher than the voltage corresponding to the highest transmittance, sacrificing the transmittance. An increased response speed by the overshoot driving (e.g., application of V(d)) can be achieved only by setting the lowest gray-level voltage as such.

As described above, according to the present embodiment, an LCD having improved fall response characteristics and preferably used for moving picture display is provided.

Figure 6:
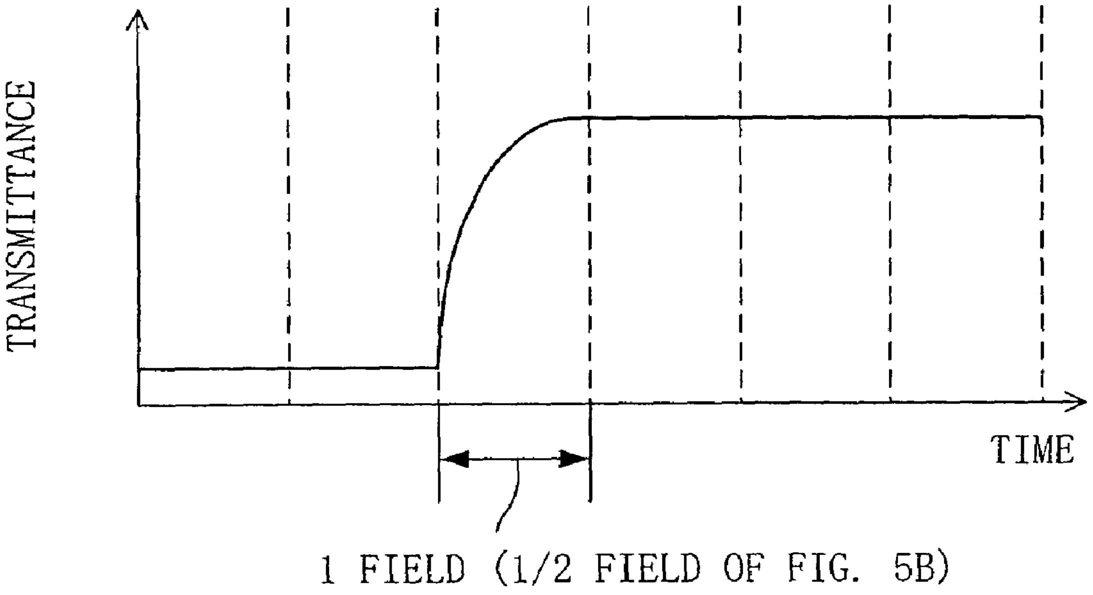
FIG. 6 is a graph schematically showing a change in transmittance with time in another LCD of the embodiment.

The above example has been described for the liquid crystal panel that includes a liquid crystal layer having a relatively high response speed, i.e., the liquid crystal panel achieving a steady-state transmittance corresponding to an applied voltage within a single field. However, in a liquid crystal panel that requires a relatively long time (e.g., two fields) to reach a steady-state transmittance corresponding to an applied voltage, a prescribed display state (transmittance) cannot be implemented with the response characteristics shown by curve L2. In contrast, with the response characteristics of curve L1, a prescribed display state can be implemented in a single field, as shown in FIG. 6. FIG. 6 shows the time-axis unit of FIG. 5B reduced by half. As a result, blurred moving picture display is prevented from being produced by overlapping of the respective images of the previous field and the current field.

Alternatively, in the case where the overshoot driving is conducted to a liquid crystal panel that includes a liquid crystal layer having a relatively high response speed as shown in FIG. 5B, the response characteristics shown in FIG. 6 can also be obtained by the following method: a field of FIG. 5B is further divided into two fields, so that the overshoot-drive voltage V(a) is applied in the former field and the voltage V(b) corresponding to a prescribed gray-level voltage Vg is applied in the latter field. In other words, by doubling a frequency for supplying a driving voltage to the liquid crystal panel, the transmittance is prevented from decreasing after increasing to a prescribed value or more as shown by curve L1 of FIG. 5B, and an extremely steep change in transmittance can be implemented as shown in FIG. 6. Thus, by further improving the response characteristics of the liquid crystal panel that attains a steady-state transmittance corresponding to an applied voltage within a single field even without conducting the overshoot driving, the time for the liquid crystal panel to be in a predetermined display state (time integral value of the transmittance) is increased, whereby the display quality (brightness, contrast ratio and the like) can be improved.

Thus, according to the present invention, a fast-response LCD suitable for moving picture display can be obtained.

(Display Mode)

The present invention is applicable to various LCDs. As described above, however, the response characteristics of the liquid crystal panel depend on the response speed of the liquid crystal layer (liquid crystal material, orientation mode and the like). Accordingly, by using a liquid crystal layer having a high response speed, a faster LCD having excellent moving picture display characteristics can be obtained.

Figure 7:
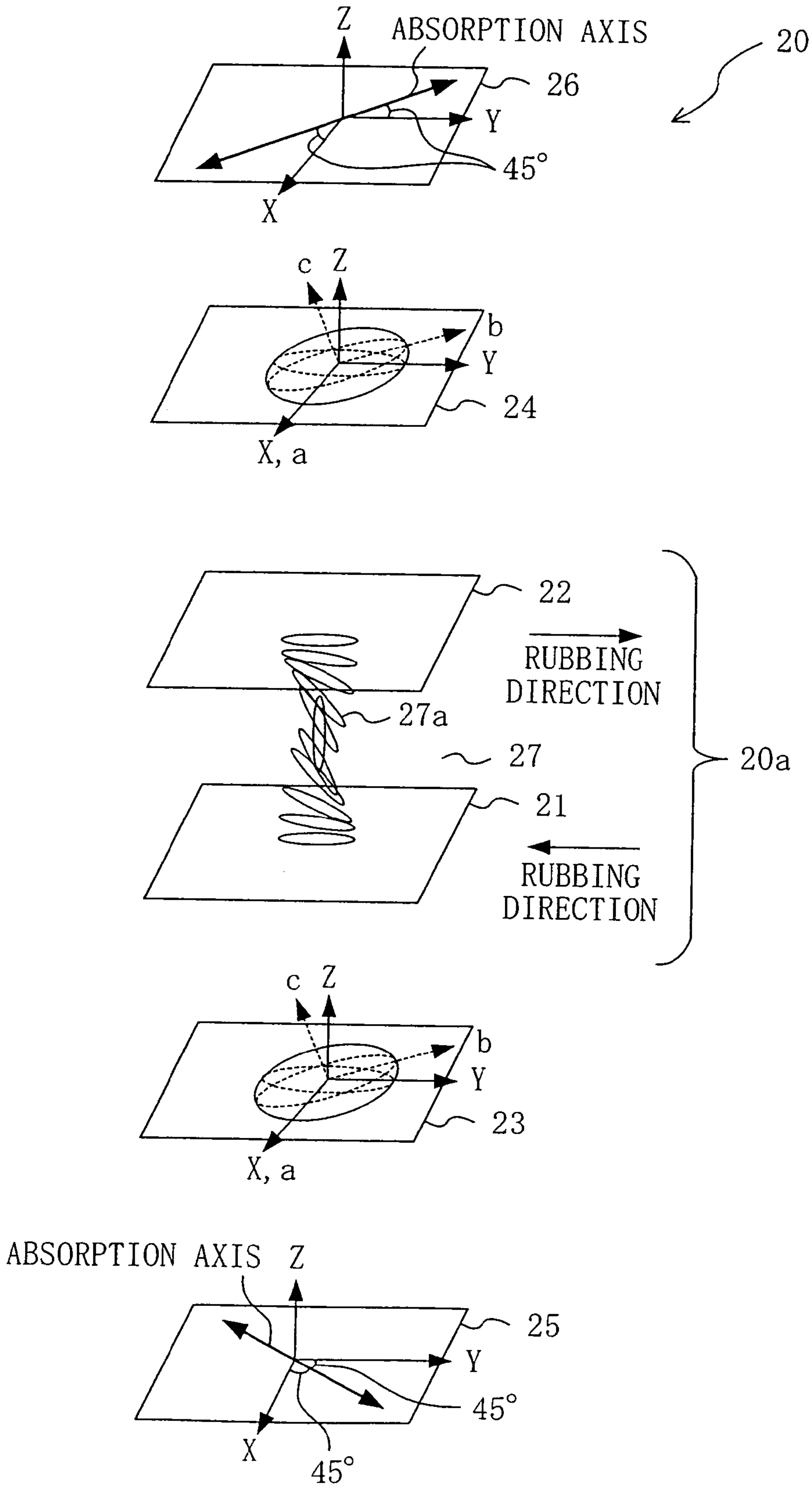
FIG. 7 is a diagram schematically showing a NW-mode transmission-type liquid crystal panel using a parallel-orientation liquid crystal layer, which is included in the LCD according to the embodiment of the present invention.

FIG. 7 schematically shows a NW-mode transmission-type liquid crystal panel 20 in ECB (Electrically Controlled Birefringence) mode using a parallel-orientation (homogeneous-orientation) liquid crystal layer. The ECB mode is known as a liquid crystal mode having a fast response speed.

The liquid crystal panel 20 includes a liquid crystal cell 20*a*, a pair of polarizers 25 and 26 interposing the liquid crystal cell 20*a* therebetween, and phase compensators 23 and 24 provided between the respective polarizers 25, 26 and the liquid crystal cell 20*a*.

The liquid crystal cell 20*a* includes a liquid crystal layer 27 provided between a pair of substrates 21 and 22. The substrates 21 and 22 each includes a transparent substrate (e.g., glass substrate), a transparent electrode (not shown) for applying a voltage to the liquid crystal layer 27, and an alignment film (not shown) for defining the orientation direction of liquid crystal molecules 27*a* in the liquid crystal layer 27. The transparent electrode and the alignment film are both provided at the surface of the transparent substrate that faces the liquid crystal layer 27. It should be understood that a color filter layer (not shown) may further be included as required. The transparent electrode is formed from, e.g., ITO (Indium Tin Oxide).

The liquid crystal layer 27 is a parallel-orientation liquid crystal layer. When a voltage is not applied, the liquid crystal molecules 27*a* in the liquid crystal layer 27 are oriented substantially in parallel with the plane of the liquid crystal layer 27 (in parallel with the substrate surface) (but slightly tilted with respect to the plane by a pre-tilt angle), and also substantially in parallel with each other (without being affected by the pre-tilt angle). An index ellipsoid of an anchoring layer is slightly tilted by the pre-tilt angle clockwise about the X-axis in the XYZ coordinate system having the plane of the liquid crystal layer 27 (i.e., the display plane) as XY plane.

The parallel-orientation liquid crystal layer is obtained by rubbing the alignment films provided on both sides of the liquid crystal layer 27 in anti-parallel with each other (see the arrows indicating the rubbing directions in FIG. 7). Note that, if the alignment films provided on both sides of the liquid crystal layer 27 are rubbed in parallel with each other, the liquid crystal molecules at one alignment film make twice the pre-tilt angle with those at the other alignment film. Therefore, the liquid crystal molecules 27*a* are not oriented in parallel with each other.

The pair of polarizers (e.g., polarizing plates or films) 25 and 26 are provided such that their respective absorption axes (the arrows in FIG. 7) are orthogonal to each other and extend at an angle of 45 degrees with respect to the aforementioned rubbing direction (the orientation direction of the liquid crystal molecules within the plane of the liquid crystal layer).

As shown in FIG. 7, in each of the phase compensators (e.g., phase plates or phase films) 23 and 24, an index ellipsoid (having principal axes a, b and c) is slightly rotated about the a-axis, which is in parallel with the X-axis, in the XYZ coordinate system having the plane of the liquid crystal layer 27 (i.e., the display plane) as XY plane. Herein, the Y-axis is in parallel (or anti-parallel) with the rubbing direction, and the b-axis of the index ellipsoid is inclined from the Y-axis. In other words, the major axis (b-axis) of the index ellipsoid is inclined counterclockwise with respect to the X-axis within the YZ plane. The phase compensators 23 and 24 thus provided are referred to as inclined phase compensators.

These phase compensators 23 and 24 have a function to compensate for the retardation of the anchoring layers of the liquid crystal layer 27. Even if a voltage of, e.g., 7 V is applied to the liquid crystal layer 27, the liquid crystal molecules anchored by the alignment films (not shown) maintains their orientation in parallel with the plane of the liquid crystal layer 27. Therefore, the retardation of the liquid crystal layer 27 does not become zero. The phase compensators 23 and 24 compensate for (cancel) this retardation.

Figure 8:
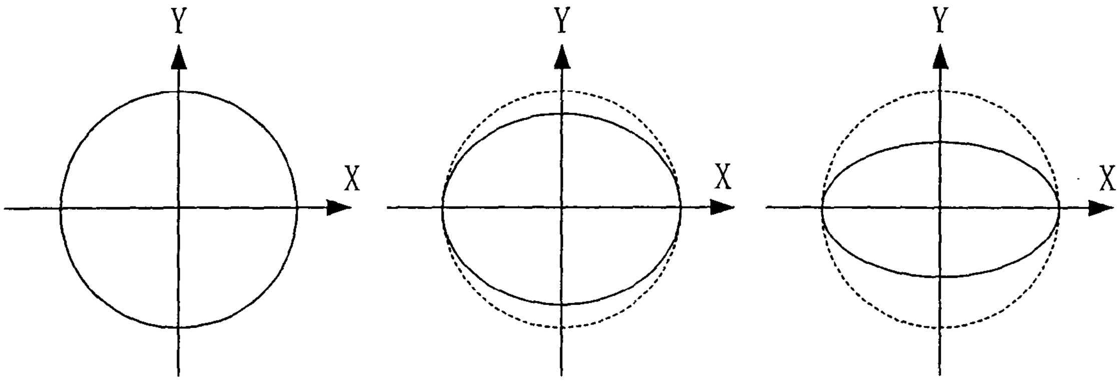
FIG. 8 is a diagram illustrating functions of a phase compensator used in the embodiment.

It is now assumed that, as a typical example, the principal refractive indices na, nb and nc in the respective principal-axis directions are given by the expression: na=nb>nc. As schematically shown in FIG. 8, when the index ellipsoids of the phase compensators 23 and 24 have an inclination angle (an angle of the b-axis from the Y-axis) of zero degree, the transverse (in-plane) retardation of the phase compensators 23 and 24 (retardation for the light incident from the direction normal to the display plane (in parallel with the Z-axis in the figure)) is zero. However, as the inclination angle is increased, the retardation is produced and increased. This can be understood as follows: as shown in FIG. 8, the index ellipsoid having an inclination angle of zero degree looks like a perfect circle as viewed from the direction normal to the display plane. However, as the inclination angle is increased, the index ellipsoid looks more like an ellipsoid.

Accordingly, when the phase compensators 23 and 24 each having the inclined index ellipsoid as described above are provided such that the inclination direction (b-axis direction) is in parallel or anti-parallel with the rubbing direction, retardation of the anchoring layers can be cancelled by the transverse (in-plane) retardation of the phase compensators 23 and 24. Accordingly, in the above example, the retardation of the liquid crystal layer 27 at the applied voltage of 7 V is cancelled (the retardation of the liquid crystal panel 20 at the applied voltage of 7 V is reduced to zero), whereby the transmittance of 0%, i.e., black display, can be implemented.

Figure 9:
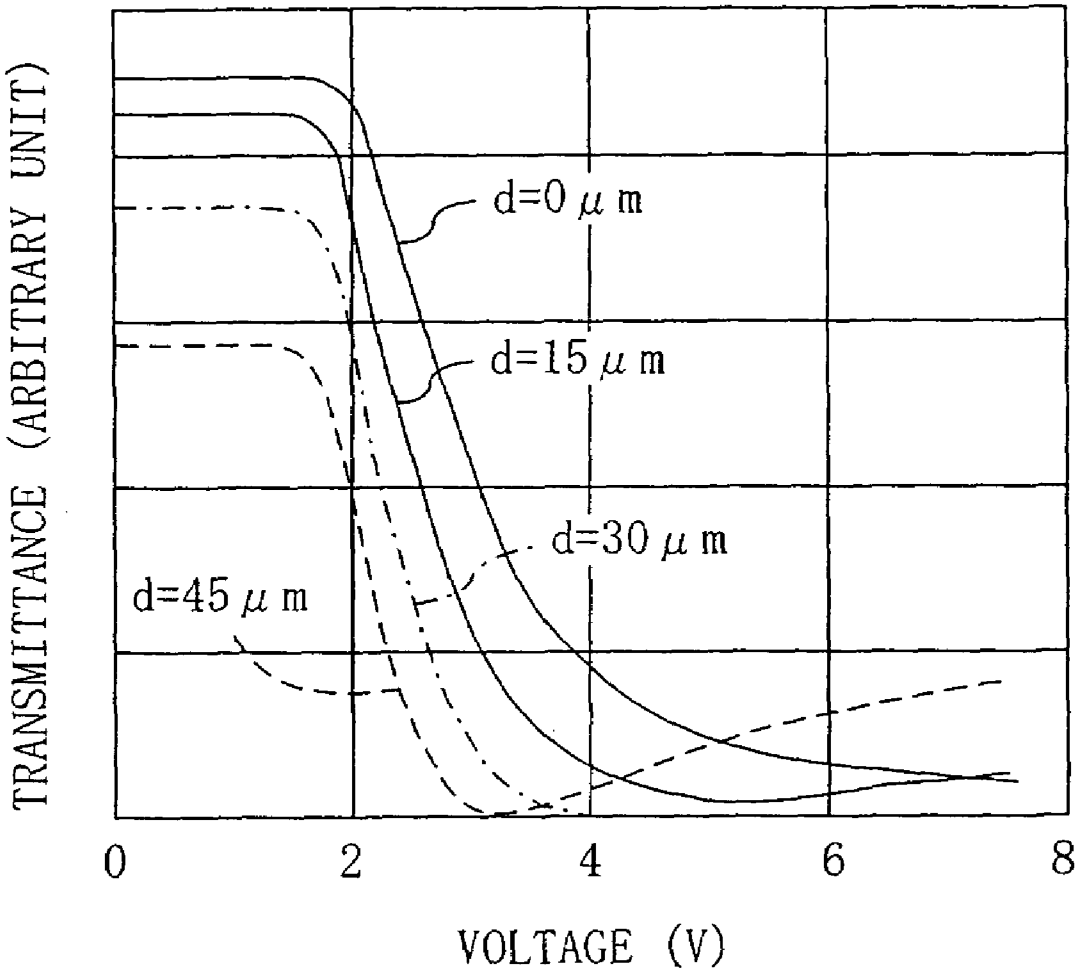
FIG. 9 is a graph showing the effects of the thickness of the phase compensator on the V-T curve of the liquid crystal panel.

The transverse (in-plane) retardation of the phase compensators 23 and 24 can be adjusted with the principal refractive indices, inclination angle, and thickness of the respective index ellipsoid. By changing the amount of transverse (in-plane) retardation of the phase compensators 23 and 24, the amount of retardation of the liquid crystal panel 20*a* to be cancelled can be changed. Accordingly, not only the retardation of the anchoring layers of the liquid crystal layer 27 but also the retardation of the liquid crystal layer 27 upon application of a given voltage are cancelled, so that the range of the gray-level voltage Vg can be arbitrarily adjusted. For example, FIG. 9 shows V-T curves of various liquid crystal panels 20. In these liquid crystal panels 20, the principal refractive indices and inclination angle of the index ellipsoids are fixed, and only the thickness d of the phase compensators 23 and 24 (thickness in the direction normal to the display plane) are varied. Note that the transmittance is a transmittance in the direction normal to the display plane. Thus, it can be appreciated that the V-T curve can be controlled by controlling the optical characteristics of the phase compensators 23 and 24. It is apparent from the foregoing description that the same effects can also be obtained by controlling the inclination angle and/or principal refractive indices of the index ellipsoid.

The response time of the liquid crystal panel 20 (according to the conventional driving method that does not use the overshoot driving) is about a half of 30 ms, which is a typical response time of the conventional TN mode liquid crystal panel. Although the liquid crystal layer of the TN mode liquid crystal panel has a twisted orientation structure, the homogeneous orientation does not have a twisted orientation structure. Therefore, it can be understood that such a short response time results from the simplicity of the orientation structure.

Moreover, an optical element for diffusing the light transmitted in or near the direction normal to the display plane (i.e., the display light) in the upward and downward directions with respect to the line of sight of the viewer, that is, an optical element having the lens effect only in a one-dimensional direction (e.g., BEF (Brightness Enhancement Film) made by Sumitomo 3M Ltd.) is provided on the display plane of the liquid crystal panel 20. Thus, the liquid crystal panel 20 having nearly constant display quality regardless of the viewing angle, and thus having an extremely wide viewing angle can be obtained.

Figure 10:
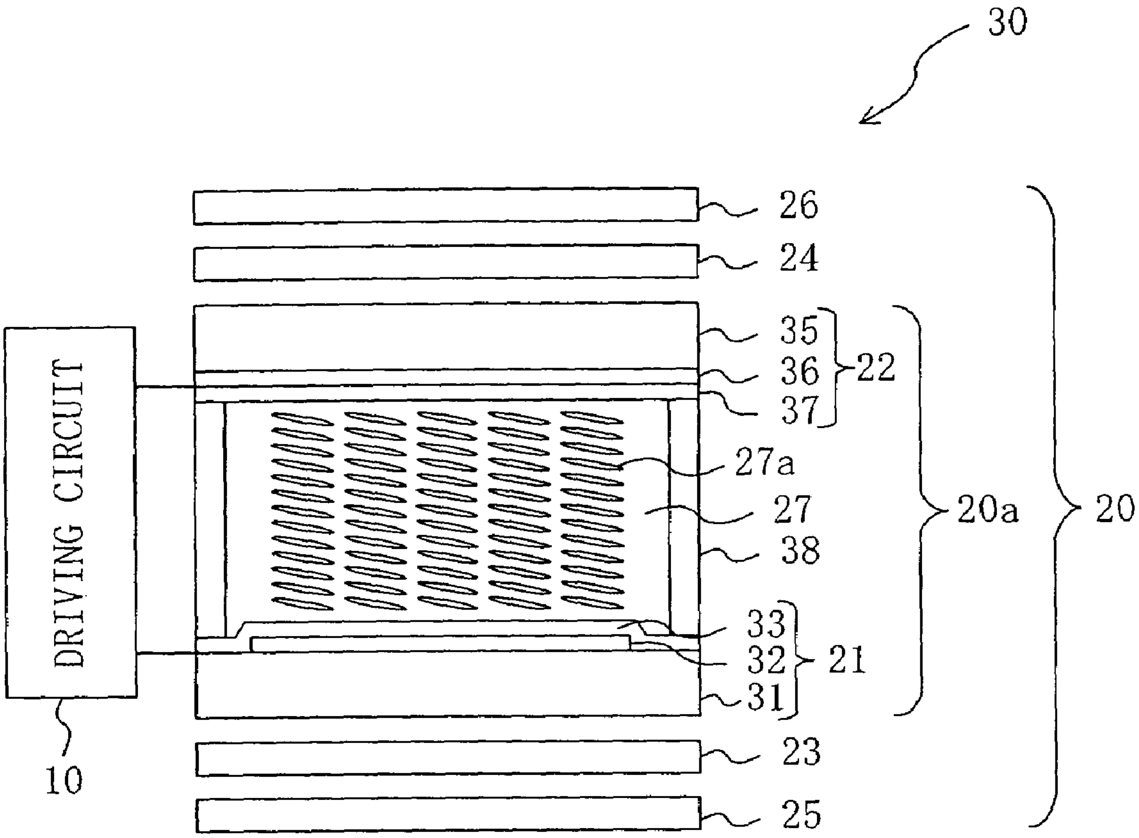
FIG. 10 is a diagram schematically showing an LCD 30 according to the embodiment of the present invention.

The LCD 30 according to the present embodiment is schematically shown in FIG. 10.

Figure 4:
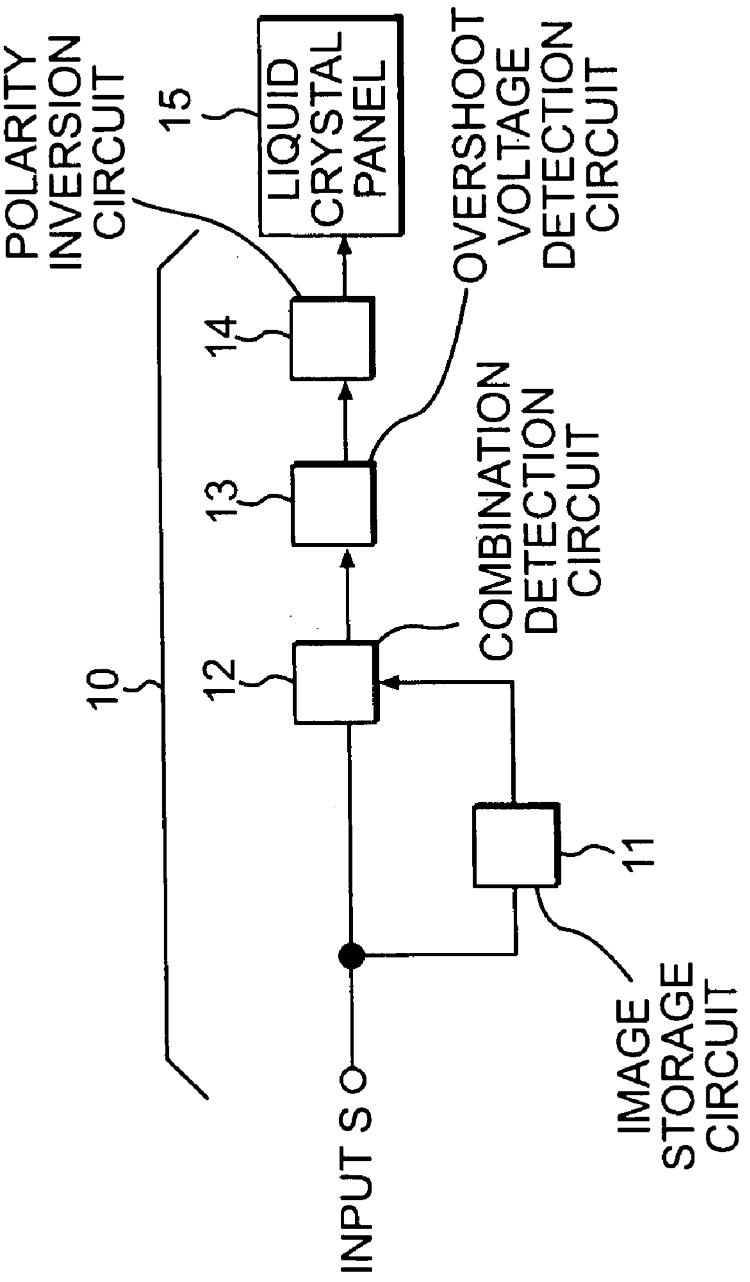
FIG. 4 is a schematic diagram showing the structure of a driving circuit 10 included in the LCD according to the embodiment of the present invention.

The LCD 30 includes the liquid crystal panel 20 shown in FIG. 7 and the driving circuit 10 shown in FIG. 4. The LCD 30 is a NW mode transmission-type LCD.

The liquid crystal panel 20 includes a thin film transistor (TFT) substrate 21 and a color filter substrate (hereinafter, referred to as "CF substrate") 22. These substrates are both made by a known method. The LCD 30 of the present embodiment is not limited to the TFT-type LCD. However, an active-matrix LCD such as TFT- or MIM- (Metal Insulator Metal) type LCD is preferable in order to implement a rapid response speed.

The TFT substrate 21 has picture-element electrodes 32 of ITO formed on a glass substrate 31, and an alignment film 33 formed over the surface of the picture-element electrodes 32 that faces the liquid crystal layer 27. The CF substrate 22 has a counter electrode (common electrode) 36 of ITO formed on a glass substrate 35 and an alignment film 37 formed over the surface of the counter electrode 36 that faces the liquid crystal layer 27. The alignment films 33 and 37 are formed from, e.g., polyvinyl alcohol or polyimide. Each alignment film 33, 37 has its surface rubber in one direction. The TFT substrate 21 and the CF substrate 22 are laminated together such that their respective rubbing directions are in anti-parallel with each other. Then, a nematic liquid crystal material having a positive dielectric anisotropy $\Delta\epsilon$ is introduced therebetween, whereby the parallel-orientation liquid crystal layer 27 is obtained. It is herein assumed that the retardation of the liquid crystal layer 27 alone is 400 nm. The liquid crystal layer 27 is sealed with a sealant 38.

The phase compensators 23 and 24 having a transverse (in-plane) retardation of 80 nm are laminated onto the respective outer surfaces of the TFT substrate 21 and CF substrate 22 such that the respective slow axes of the phase compensators 23 and 24 are orthogonal to the respective rubbing direction. The overall retardation of the liquid crystal panel 20 including the retardation of the phase compensators 23 and 24 is 320 nm. The phase compensators 23 and 24 as well as the polarizers 25 and 26 are arranged as described above in connection with FIG. 7.

The LCD 30 has V-T characteristics as shown by the 320-nm curve of FIG. 1. More specifically, the transmittance reaches the highest (maximal) value at the applied voltage of about 2 V, and then decreases with increase in applied voltage.

Hereinafter, the specific structure of the driving circuit 10 will be described.

A 6-bit (64-gray-level) progressive signal at 60 Hz for one frame is used as an input image signal S. This input image signal S is sequentially retained in the image storage circuit 11. Then, for every picture element, the combination detection circuit 12 detects at 120 Hz a combination of the current input image signal S and the input image signal S of the previous frame that is retained in the image storage circuit 11. Herein, the combination detection circuit 12 detects the combination at 120 Hz in order to conduct double-speed writing described below. The input image signal S is a signal at 60 Hz for one frame. Therefore, the input image signal S is converted into a signal having a double frequency (120 Hz) in an appropriate portion within the driving circuit 10. This conversion is herein conducted in the combination detection circuit 12.

From a 7-bit voltage (32 gray levels between the lower dedicated overshoot-driving voltages 0 V and 2 V; 64 gray levels between the gray-level voltages 2.1 V and 5 V; and 32 gray levels between the higher dedicated overshoot-driving voltages 5.1 V and 6.5 V), the overshoot voltage detection circuit 13 detects a predetermined overshoot voltage corresponding to the combination detected by the combination detection circuit 12. It is herein assumed that the overshoot voltage is a 120-Hz voltage. This overshoot voltage is supplied to the polarity inversion circuit 14 and converted into a 120-Hz AC voltage. This 120-Hz AC voltage is supplied to the liquid crystal panel 20. In other words, the 60-Hz input image signal S to the driving circuit 10 is output from the driving circuit 10 to the liquid crystal panel 20 as a 120-Hz image signal. Accordingly, the input image signal S at 60 Hz for one frame is converted into two fields of an output image signal at 120 Hz for one field (hereinafter these two fields are referred to as "first and second sub-fields"). Thus, double-speed writing to the liquid crystal panel 20 is conducted.

Herein, the driving circuit 10 is set as follows: in response to a change in input image signal S (60 Hz), the driving circuit 10 outputs the aforementioned overshoot voltage in the first sub-field of 120 Hz, and outputs a gray-level voltage Vg (no overshoot) corresponding to the input image signal S of the current frame to the liquid crystal panel 20 in the second sub-field.

Figure 11:
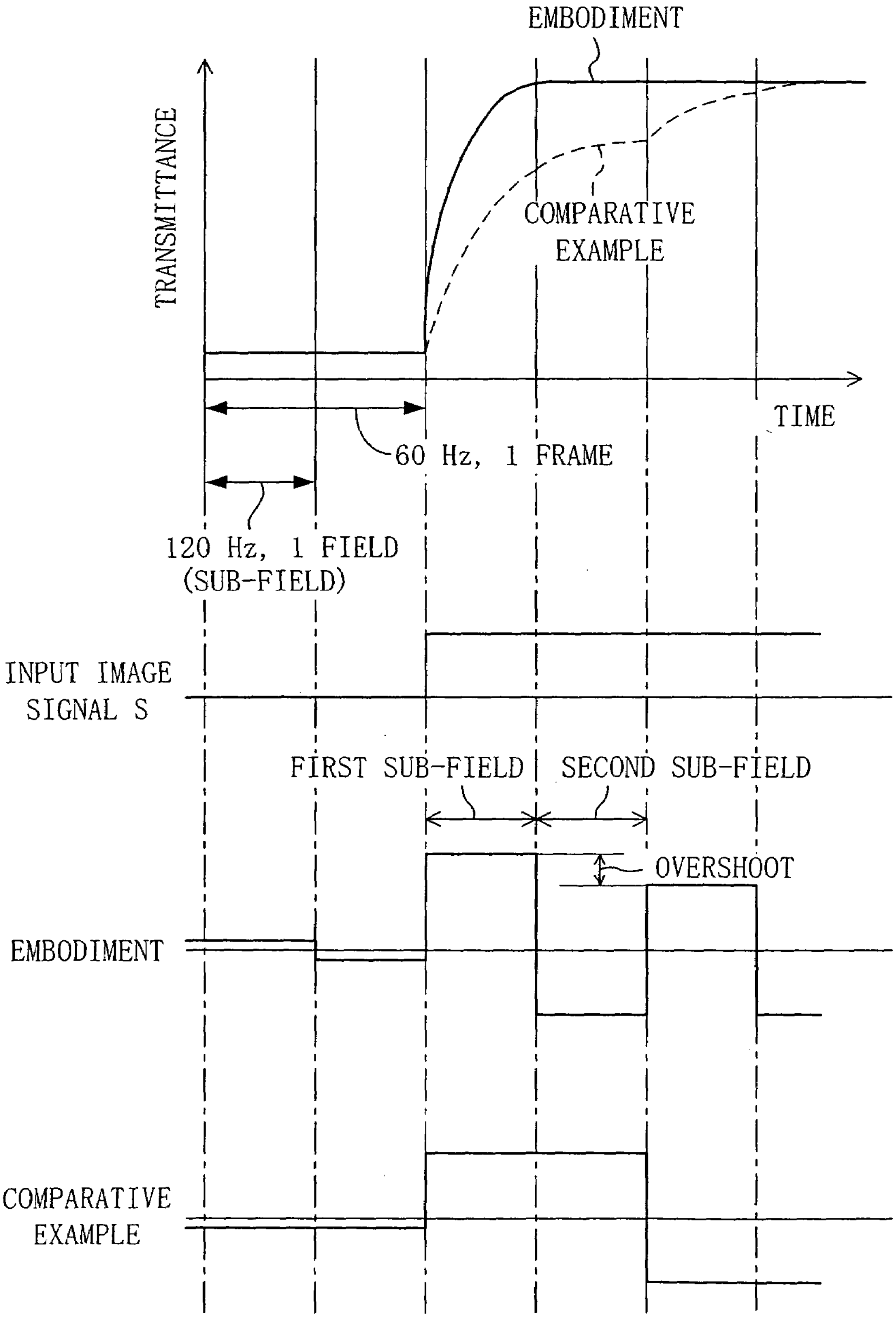
FIG. 11 is a diagram illustrating response characteristics of the LCD 30 of the present embodiment, wherein an input image signal S, a transmittance, and a voltage that is output to the liquid crystal panel are shown together with a comparative example.

FIG. 11 shows the response characteristics (solid line) of the LCD 30 of the present embodiment. As a comparative example, FIG. 11 also shows the response characteristics (dashed line) obtained without conducting overshoot driving. FIG. 11 further shows the input image signal S, a voltage that is written at a double speed to the liquid crystal panel 20, and a voltage that is output to the liquid crystal panel without conducting the overshoot driving (without conducting double-speed driving either) in the comparative example.

As shown in FIG. 11, in the case where the input image signal (60 Hz) changes toward a higher gray level (toward a lower voltage) from the first field to the second field, application of merely a prescribed gray-level voltage does not allow the transmittance to attain a prescribed value in the second field as shown by the dashed line. In contrast, the overshoot driving allows the transmittance to attain a prescribed value in a ½ field (in a single sub-field) as shown by the solid line. The effect of improving the response characteristics according to the present invention can be obtained even when the input image signal S in the second field is a signal of the highest gray level.

Note that the reason why the response characteristics of the comparative example (dashed line) changes in a discontinuous manner is as follows: during a charge-retaining period of the liquid crystal layer 27, the liquid crystal capacitance increases according to a change in liquid crystal orientation, so that the voltage being applied to the liquid crystal layer 27 is reduced.

Note that, in the description of the driving circuit 10, a non-interlace driven LCD in which a single frame corresponds to a single vertical period has been described as the LCD of present embodiment. However, the LCD according to the first aspect of the present invention is not limited to this, but can also be applied to an interlace-driven LCD in which a single field corresponds to a single vertical period.

Embodiment 2

Hereinafter, an embodiment of the LCD according to a second aspect of the present invention will be described with reference to the drawings. However, the LCD according to the second aspect of the present invention is not limited to the following embodiment.

Figure 12:
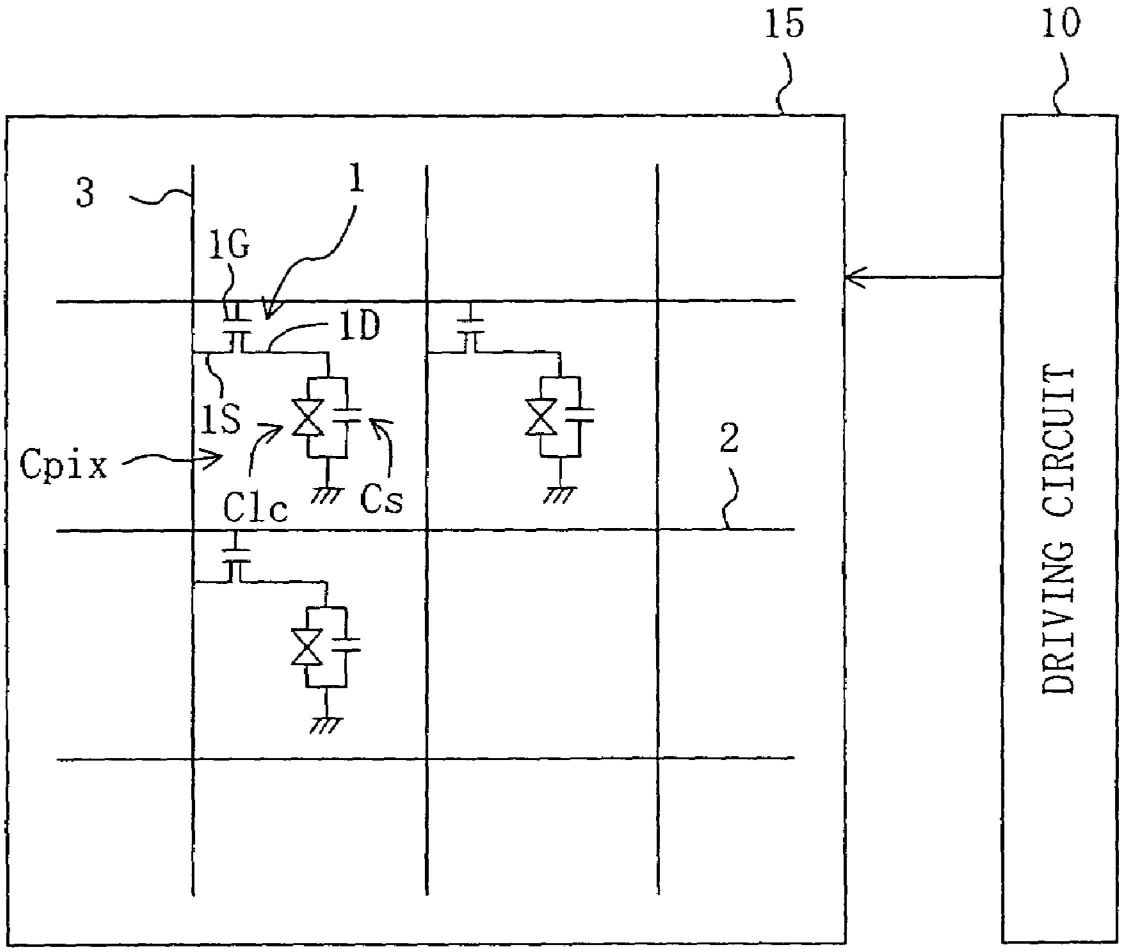
FIG. 12 is a schematic diagram showing a TFT-type LCD according to a second embodiment of the present invention.

FIG. 12 schematically shows the structure of the LCD according to the present embodiment. Note that, in the following embodiment, an interlace-driven LCD in which a single field corresponds to a single vertical period is exemplarily described.

In the case where the gray-level voltage Vg is referred to in the order of magnitude, the gray-level voltage is denoted with Vv. For example, for 64-gray-scale display from zero (black) to 63 (white) gray levels, the gray-level voltage having the lowest value is denoted with Vv0, and the gray-level voltage having the highest value is denoted with Vv63. In the case of the NW mode LCD, Vv0 is a voltage for displaying the highest gray level (63 gray level), and Vv63 is a voltage for displaying the lowest gray level (zero gray level). In contrast, in the NB mode LCD, Vv0 is a voltage for displaying the lowest gray level (zero gray level), and Vv63 is a voltage for displaying the highest gray level (63 gray level).

This LCD includes a liquid crystal panel 15 and a driving circuit 10. The liquid crystal panel 15 has a plurality of picture-element capacitors Cpix arranged in a matrix, and TFTs 1 electrically connected to the respective picture-element capacitors Cpix. Each TFT 1 has its gate electrode 1G connected to a corresponding scanning line 2 and its source electrode Is connected to a corresponding signal line 3. The driving circuit 10 applies a scanning voltage and a driving voltage to the scanning and source lines, respectively. Each TFT 1 has its drain electrode ID connected to a corresponding picture-element capacitor Cpix.

Each picture-element capacitor Cpix includes a liquid crystal capacitor Clc and a storage capacitor Cs that is electrically connected in parallel with the liquid crystal capacitor. Each liquid crystal capacitor Clc is formed from a corresponding picture-element electrode, a counter electrode, and a liquid crystal layer provided therebetween. With a driving voltage supplied from the driving circuit 10 through a corresponding TFT 1, the picture-element capacitor Cpix is charged into a charged state corresponding to an input image signal, so that the display state is updated every field. Herein, the capacitance ratio of the storage capacitor Cs to the liquid crystal capacitor Clc (hereinafter, this ratio is also referred to as Cs/Clc for simplicity) is set to 1 or more (Cs/Clc. 1). When at least the highest gray-level voltage is applied, the picture-element capacitor Cpix retains 90% or more of the charging voltage over one field. In other words, by setting the capacitance ratio of the storage capacitor Cs to the liquid crystal capacitor Clc to Cs/Clc. 1, the response speed (step response characteristics) of the charging characteristics of the picture-element capacitor is improved. Accordingly, when at least the highest gray-level voltage is applied, the picture-element capacitor Cpix retains 90% or more of the charging voltage over one field.

First, the storage capacitor Cs will be described. Conventionally, the storage capacitor Cs is generally provided in the TFT-type LCD. The storage capacitor Cs is connected in parallel with the liquid crystal capacitor Clc in order to suppress reduction in charges (voltage) retained in the liquid crystal capacitor Clc due to a leak current of the liquid crystal layer. The storage capacitor Cs is a so-called parallel-electrode condenser (capacitor) that uses as one electrode a corresponding scanning line (gate bus line) or a Cs bus line formed from the same conductive layer as that of the scanning line, and also uses as the other electrode a conductive layer (typically, ITO layer) forming the picture-element electrode. A dielectric between these electrodes is formed from, e.g., a $TaO_x$ layer and a $SiN_x$ layer formed thereon, like a gate insulating film of the TFT. The capacitance of the storage capacitor Cs indicates an electrostatic capacitance of the storage capacitor Cs. For simplicity, "Cs" herein indicates both the storage capacitor itself and the electrostatic capacitance thereof.

The capacitance of the liquid crystal capacitor Clc indicates an electrostatic capacitance of the liquid crystal capacitor Clc. For simplicity, "Clc" herein indicates both the liquid crystal capacitor itself and the electrostatic capacitance thereof. Note that the liquid crystal capacitor Clc is a capacitor using the liquid crystal layer as a dielectric layer, and the dielectric constant of the liquid crystal layer changes as the orientation state of the liquid crystal layer changes according to the applied voltage. Accordingly, the capacitance ratio of the storage capacitor Cs to the liquid crystal capacitor Clc changes according to the applied voltage. Thus, the aforementioned relation of the capacitance ratio of the storage capacitor Cs to the liquid crystal capacitor Clc, i.e., Cs/Clc. 1, is herein based on the capacitance of the liquid crystal capacitor Clc (the maximum capacitance in the actual display) at the time when the highest gray-scale voltage (e.g., 7 V) is applied to the picture-element capacitor Cpix.

Hereinafter, a signal that provides image information to be displayed on the LCD is referred to as an input image signal S, and a voltage that is applied to the picture-element capacitor Cpix according to each input image signal S is referred to as a gray-level voltage Vg.

Figure 13:
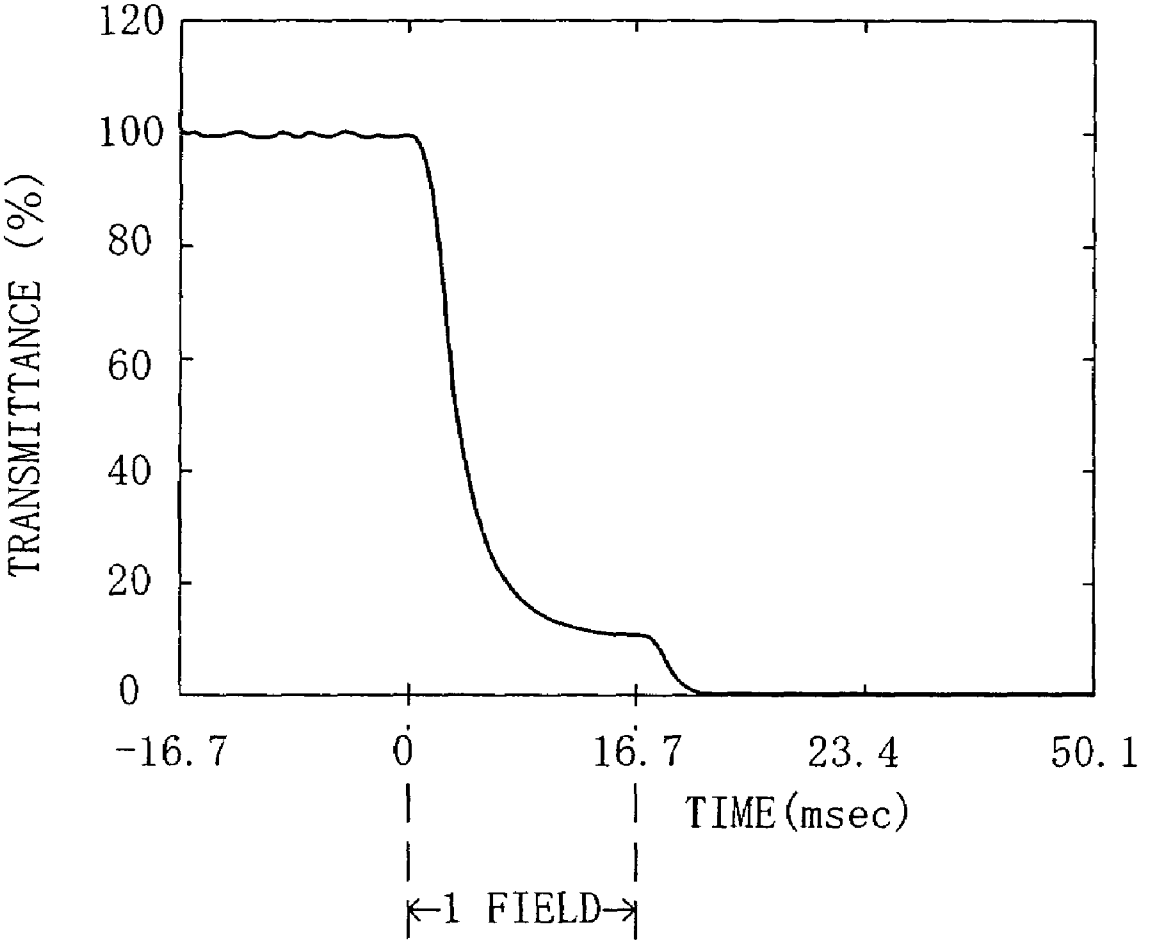
FIG. 13 is a schematic diagram illustrating a step response in the TFT-type LCD.

It is known that the TFT-type LCD exhibit step response characteristics as its response characteristics. FIG. 13 schematically shows the step response characteristics of the optical characteristics (transmittance) of the TFT-type LCD. In FIG. 13, the ordinate indicates a transmittance, but this can be replaced with a charging voltage of the picture-element capacitor Cpix. The principles of the step response characteristics of the transmittance (or charging voltage) will now be described with reference to FIG. 13.

In the TFT-type LCD, the amount of charges (Q) stored in a single picture-element capacitor Cpix is determined from the voltage (V) applied to the picture-element capacitor Cpix during the ON state of the corresponding TFT and the capacitance of the picture-element capacitor Cpix (C=Clc+Cs) at that time. Herein, the ON state of the TFT is a period during which a scanning voltage is applied to the gate electrode thereof, and this period is also referred to as a horizontal scanning period. Moreover, the voltage (V) applied to the picture-element capacitor Cpix corresponds to the potential difference between the corresponding picture-element electrode and the counter electrode. This relation is given by the expression: Q=CV. In other words, when the TFT is turned ON, the corresponding picture-element capacitor Cpix is charged until the amount of charges (Q) determined by Q=CV is stored therein. If the picture-element capacitor Cpix retains 100% of the voltage (i.e., if there is no leak current), the charges (Q) are retained until the TFT is again turned ON in the following field (or frame; hereinafter, a single field is used).

In the period during which the picture-element capacitor Cpix retains the charges loaded therein (this period corresponds to a single field), the voltage (V) of the picture-element capacitor Cpix decreases gradually. This is because the liquid crystal molecules of $\Delta\epsilon>0$ that are oriented in parallel with the electrode plane of the pair of opposing electrodes are raised in the direction normal to the electrode plane according to the applied voltage (i.e., the liquid crystal molecules are oriented in parallel with the electric field). According to this change in orientation of the liquid crystal molecules, the dielectric constant of the liquid crystal layer is increased, whereby the capacitance of the liquid crystal capacitor Clc is increased. In other words, the capacitance of the picture-element capacitor Cpix is increased. As the capacitance (C) of the picture-element capacitor Cpix is increased, the voltage (V) on the picture-element capacitor Cpix is reduced according to the relation: Q=CV. Thus, the voltage retained in the picture-element capacitor Cpix is reduced during a single field, whereby the transmittance (or charging voltage) changes stepwise on a field-by-field basis (step response), as shown in FIG. 13.

Note that this step response does not occur in a so-called static driving method in which a voltage is continuously applied to the picture-element capacitor Cpix over a single field. Thus, the TFT-type LCD including a step-responding liquid crystal panel has a lower response speed than that of the statically driven LCD in which a voltage is continuously applied to the liquid crystal layer. As a result, the degree of residual image is increased, degrading the moving picture display quality.

In the LCD according to the second aspect of the present invention, the capacitance ratio of the storage capacitor Cs to the liquid crystal capacitor Clc satisfies the relation: Cs/Clc. 1. Therefore, even if the capacitance of the liquid crystal capacitor Clc is increased according to a change in orientation of the liquid crystal molecules, a change in capacitance of the picture-element capacitor Cpix is suppressed. Accordingly, the aforementioned step response of the transmittance (or charging voltage) is suppressed. Moreover, provided that the capacitance ratio of the storage capacitor Cs to the liquid crystal capacitor Clc satisfies the relation: Cs/Clc. 1, the picture-element capacitor Cpix can retain 90% or more of the charging voltage corresponding to the input image signal S over a single field. As a result, the liquid crystal panel can attain 90% or more of a prescribed transmittance corresponding to the input image signal S within a single field. In order to increase the capacitance of the storage capacitor Cs, it is only necessary to increase the area of the storage capacitor Cs, or reduce the thickness of the dielectric layer, or form the dielectric layer from a material having a larger dielectric constant.

Figure 14:
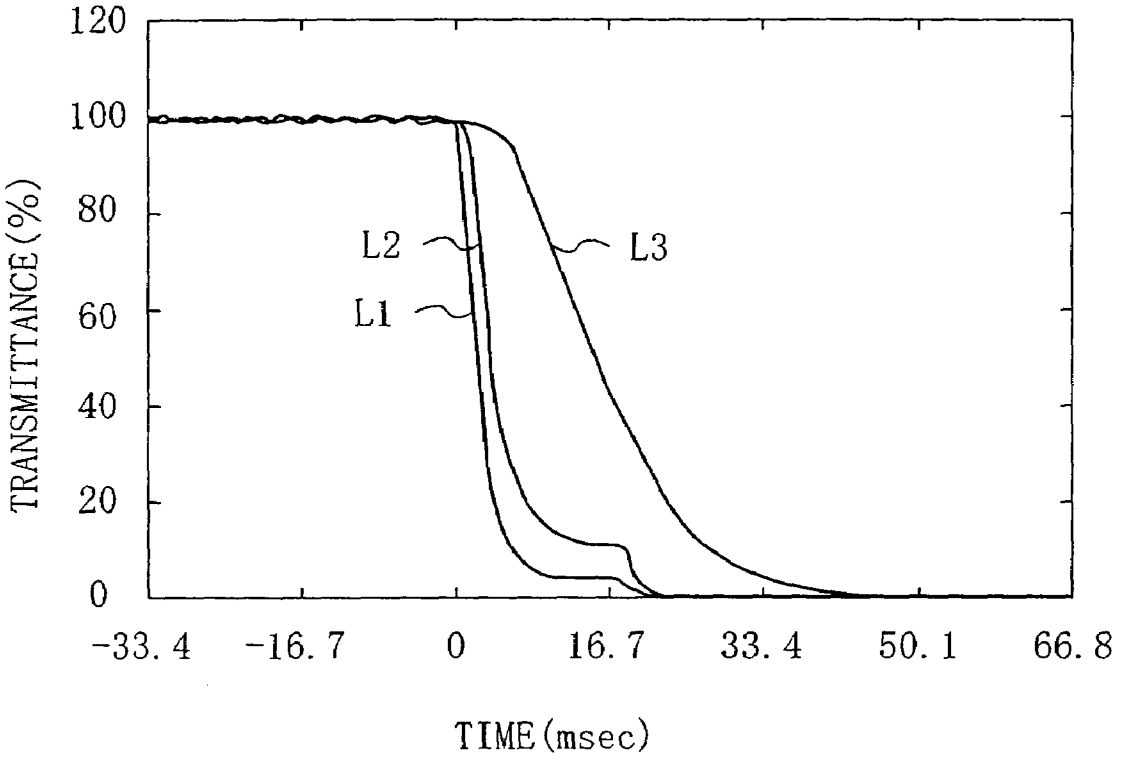
FIG. 14 is a diagram schematically showing a change in transmittance with time when the gray level of an input image signal is changed.

Assuming that the input image signal S (60 Hz) is changed from the lowest gray-level voltage (Vv0) to the highest gray-level voltage (e.g., Vv63) in the NW mode LCD, a change in transmittance with time will be described with reference to FIG. 14. The abscissa of FIG. 14 is scaled every field, i.e., every 16.7 msec, from the point where the input image signal S is shifted. Three curves in the figure show a change in transmittance with time for the liquid crystal panels that are different in the capacitance ratio of the storage capacitor Cs to the liquid crystal capacitor Clc (Cs/Clc) and in viscosity of the liquid crystal material. In FIG. 14, the transmittance after one field corresponds to about 95% of the target transmittance in curve L1, about 90% in curve L2, and about 60% in curve L3.

As shown in FIG. 14, the relation between the transmittance after one field (after 16.7 msec) and the number of fields required for the transmittance to reach the target value shows that, in the case where the transmittance after one field corresponds to approximately 90% or more of the target value, the transmittance reaches the target value within two fields (within 33.4 msec), as shown by curves L1 and L2. In contrast, in the case where the transmittance after one field corresponds to less than 90% of the target value (in the case of the conventional LCD), it takes more than two fields for the transmittance to reach the target value, as shown by curve L3 of FIG. 14.

As a result of comparison of the moving picture display characteristics between the LCD requiring more than two fields for the transmittance to reach the target value and the LCD whose transmittance reaches the target value within two fields, the residual image was obviously reduced more in the latter LCD than in the former LCD.

Figure 15:
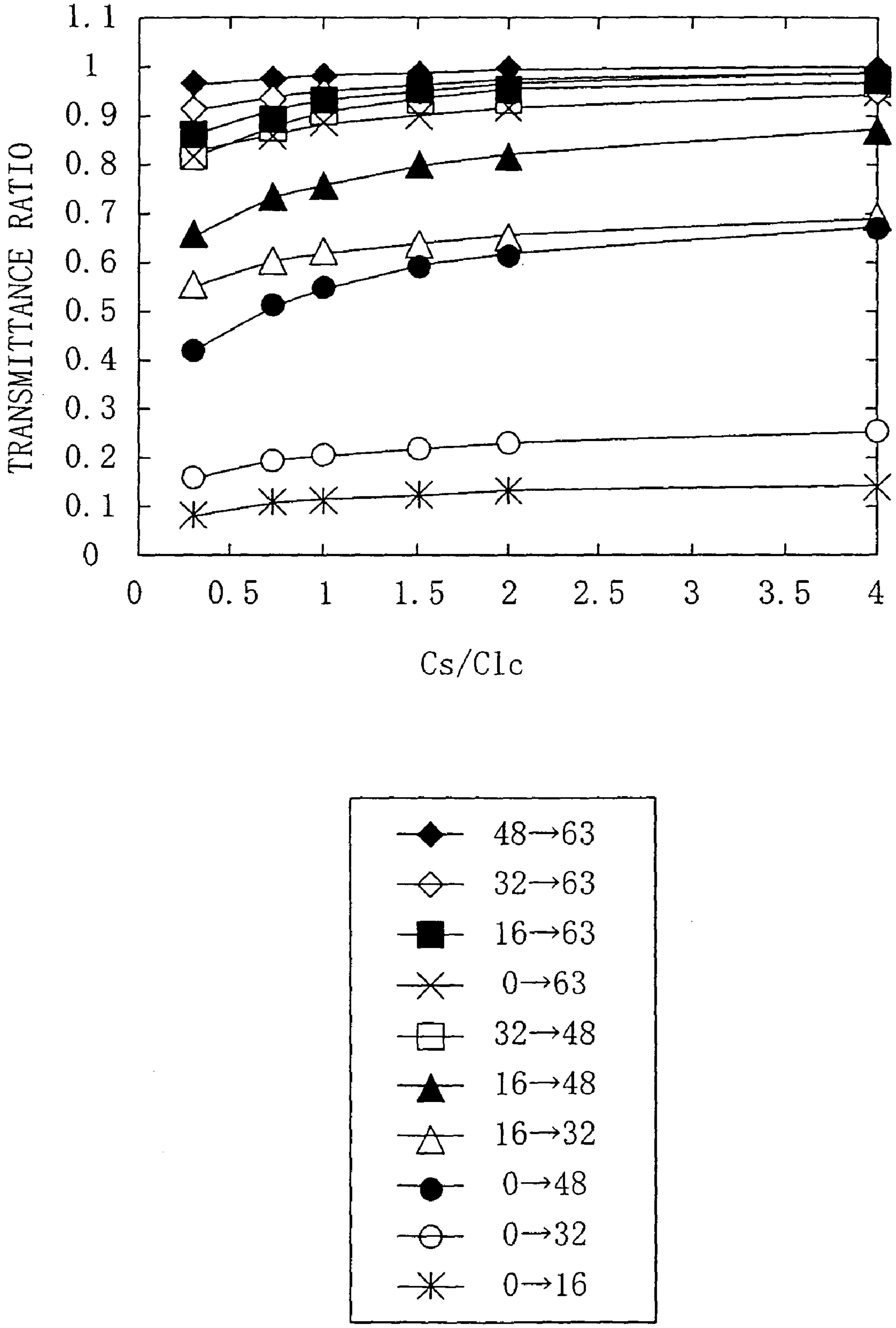
FIG. 15 is a graph showing a change in transmittance in NW mode LCDs having various Cs/Clc values in the case where the input image signals (gray-level voltages) of the previous and current fields are different from each other.

FIG. 15 shows a change in transmittance in the NW mode LCDs having various Cs/Clc values in the case where the input image signals S (gray-level voltages Vg) of the previous and current fields are different from each other. The transmittance ratio of the ordinate indicates the ratio of a transmittance after one field to a steady-state transmittance of the gray-level voltage Vg corresponding to the input image signal S of the current field. More specifically, in the case where a prescribed transmittance of the current field is reached within one field, the transmittance ratio of the ordinate is 1. In the legend, the numerical values on the left side indicate a gray-level voltage of the previous field (e.g., 48 indicates the gray-level voltage Vv48), and the numerical values on the right side indicate a gray-level voltage of the current field. In the case of the 64-gray-scale display, Vv0 is the lowest gray-level voltage, and Vv63 is the highest gray-level voltage (corresponding to the highest limit signal). It can be seen from FIG. 15 that, with the value Cs/Clc being set to 1 or more, the transmittance after one field corresponds to 90% or more of a steady-state transmittance (the transmittance ratio is 0.9 or more) when the highest gray-level voltage Vv63 is applied. In other words, with the value Cs/Clc being set to 1 or more, the picture-element capacitor Cpix retains 90% or more of the charging voltage over one field when the highest gray-level voltage Vv63 is applied.

(Overshoot Driving)

As described above, setting the value Cs/Clc to 1 or more allows the transmittance to reach 90% or more of a steady-state transmittance after one field when the highest gray-level voltage Vv63 is applied. However, when a gray-level voltage (intermediate-gray-level voltage) lower than the highest gray-level voltage Vv63 is applied for each gray level, the response speed is improved, but still is not enough. Therefore, even if the value Cs/Clc is set to 1 or more, the transmittance ratio after one field does not reach 0.9.

Such a response speed in the intermediate-gray-scale display state can be improved by overshoot driving described in the first embodiment. More specifically, according to combination of the respective input image signals S of the previous field and the current field, a predetermined driving voltage overshooting the gray-level voltage Vg corresponding to the input image signal S of the current field is supplied to the liquid crystal panel.

As described in the first embodiment, comparison of the input image signal S for detecting the overshoot voltage is made between the respective input image signals S of the previous and current fields for every picture element. Even in the interlace driving in which image information corresponding to a single frame is divided into a plurality of fields, the input image signal S of a picture element of interest in the previous frame and the input image signals S of the upper and lower lines are used as supplementary signals, so that the signals corresponding to all the picture elements are applied within a single vertical period. Thus, the input image signals S of the previous and current fields are compared with each other.

The overshoot voltage may either be another gray-level voltage Vg having a prescribed overshoot amount with respect to a prescribed gray-level voltage Vg, or a dedicated overshoot-driving voltage that is prepared in advance for the overshoot driving. In order to improve the response speed of the intermediate-gray-scale display state, an overshoot driving voltage that is set based on the gray-level voltage Vg is used. A dedicated overshoot-driving voltage may be used for further improvement in response speed.

(Circuit for Conducting Overshoot Driving)

The driving circuit in the LCD of the present embodiment has the same structure as that of the driving circuit 10 described in the first embodiment in connection with FIG. 14. Therefore, description thereof is omitted.

Hereinafter, the input/output signal of each circuit will be described with reference to FIG. 4. In the following description, it is assumed that a voltage used for overshoot driving is preset to a gray-level voltage Vg that is higher than the gray-level voltage Vg corresponding to the input image signal S.

First, the image storage circuit 11 retains the input image signal S corresponding to one field before the input image signal S of the current field. The combination detection circuit 12 detects, for every picture element, a combination of the input image signal S of the current field and the input image signal S of the previous field retained in the image storage circuit 11. For convenience, the combination of the input image signals S (gray-level data) detected by the combination detection circuit 12 is indicated by a combination of the corresponding gray-level voltages. For example, in the NW mode, the combination of the input image signal S63 of the previous field and the input image signal S35 of the current field is indicated by a combination of the corresponding gray-level voltages (Vv0, Vv28).

The overshoot voltage detection circuit 13 detects a gray-level voltage Vv44 that is predetermined for the combination (Vv0, Vv28) detected by the combination detection circuit 12, and supplies the gray-level voltage Vv44 to the polarity inversion circuit 14 as a driving voltage. This operation corresponds to conversion of the gray-level voltage Vv28 corresponding to the input image signal S of the current field to the gray-level voltage Vv44. For example, the process of detecting the gray-level voltage Vv44 as a predetermined overshoot voltage corresponding to the combination (Vv0, Vv28) detected by the combination detection circuit 12 may be conducted either by a lookup table method or by performing a predetermined operation.

Finally, the polarity inversion circuit 14 converts the gray-level voltage Vv44 to an AC signal for supply to the liquid crystal panel 15.

A specific method for setting the overshoot gray-level voltage Vg (driving voltage) for the input image signal S of the current field will be described. In the following description, it is assumed that the gray-level voltage corresponding to the input image signal S of the previous field is Vv0, and the gray-level voltage corresponding to the input image signal S of the current field is Vv28, and that the overshoot gray-level voltage Vv44 (which overshoots Vv28) is used as a driving voltage.

Figure 16:
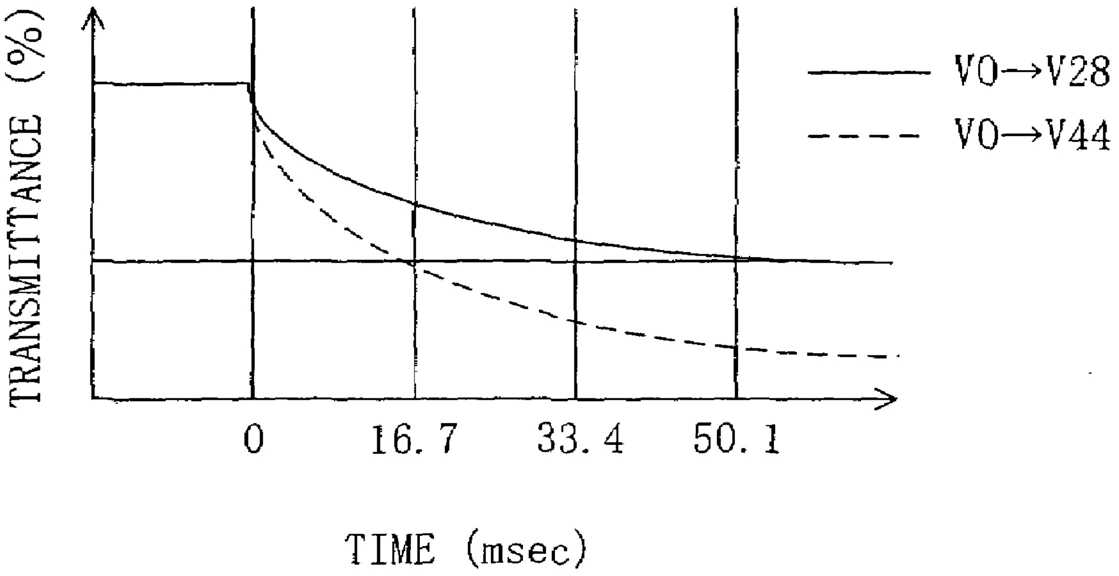
FIG. 16 is a diagram showing a change in transmission with time according to a change in gray-level voltage (input image signal).

FIG. 16 shows a change in transmittance with time according to a change in gray-level voltage (input image signal). The solid line shows the case where the gray-level voltage Vv28 of the current field is supplied in the state where the transmittance is stable at a steady-state transmittance of the gray-level voltage Vv0 of the previous field, and the gray-level voltage Vv28 is continuously supplied in the following fields. A single field corresponds to 16.7 msec. The dashed line in FIG. 16 shows the case where the gray-level voltage Vv44 of the current field is supplied in the state where the transmittance is stable at a steady-state transmittance of the gray-level voltage Vv0 of the previous field, and the gray-level voltage Vv44 is continuously supplied in the following fields.

It can be seen from FIG. 16 that it takes about three fields from application of the gray-level voltage Vv28 until the transmittance become stable. In other words, it takes about three fields for the transmittance to reach a steady state transmittance of the gray-level voltage Vv28. On the other hand, in the case of the gray-level voltage Vv44, the transmittance reaches the steady state transmittance of the gray-level voltage Vv28 after about one field, and then goes toward a steady state transmittance of the gray-level voltage Vv44.

As can be seen from this, in order to change (update) the transmittance of the liquid crystal panel from the steady-state transmittance of Vv0 to that of Vv28 within a single field, the gray-level voltage Vv44 need only be supplied instead of Vv28. Thus, for every combination of the input image signals S (combination of the previous and current fields), an overshoot voltage is determined so that the transmittance reaches within a single field a steady state transmittance (desired transmittance) of the gray-level voltage Vg corresponding to the input image signal S of the current field.

Hereinafter, a method for conducting overshoot driving for every gray-level voltage will be described. In particular, a method for setting an overshoot voltage for the highest gray-level voltage (Vv63) and the lowest gray-level voltage (Vv0) will be described. Herein, the description will be exemplarily given for the case of the highest gray-level voltage.

First, voltages of 128 gray levels (Vv'0 to Vv'127) are prepared in advance for gray-level voltages of 64 gray levels (Vv0 to Vv63). For example, the voltages Vv'32 to Vv'95 (64 gray levels) are assigned to the voltages Vv0 to Vv63 (64 gray levels). The voltages Vv'0 to Vv'31 are used as a lower dedicated overshoot-driving voltage, and the voltages Vv'96 to Vv'127 are used as a higher dedicated overshoot-driving voltage.

For example, it is now assumed that the gray-level voltage corresponding to the input image signal S is shifted from Vv44 to Vv63 after one field. These gray-level voltages Vv44 and Vv63 are input to the image storage circuit 11 (see FIG. 4) as digital signals respectively corresponding to Vv'76 and Vv'95 by a circuit for assigning the gray-level voltages of 128 gray levels (i.e., a circuit for converting a 6-bit digital signal to a 7-bit digital signal). The combination detection circuit 12 detects the combination (Vv'76, Vv'95). Then, the overshoot voltage detection circuit 13 detects the voltage Vv'100 that is predetermined so as to attain a steady-state transmittance of Vv'95 within one field, and then outputs the voltage Vv'100 to the polarity inversion circuit 14 as a driving voltage. This driving voltage Vv'100 is then converted into an AC signal in the polarity inversion circuit 14 for supply to the liquid crystal panel 15. In the case of the lowest gray-level voltage (Vv0) as well, a driving voltage lower than the lowest gray-level voltage (Vv0) can be similarly supplied to the liquid crystal panel 15.

Thus, the voltages of 128 gray levels (including dedicated overshoot-driving voltage of 64 gray levels) are prepared in advance for the gray-level voltages of 64 gray levels. This makes it possible to use a voltage higher than the highest gray-level voltage (Vv63 of the 64 gray levels) and a voltage lower than the lowest gray-level voltage (Vv0) as an overshoot voltage. In this case, however, improvement in withstand voltage of the driver and/or extension of the controller are required.

As described above, by conducting the overshoot driving with the capacitance ratio of the storage capacitor Cs to the liquid crystal capacitor Clc (Cs/Clc) being set to 1 or more, an increased response speed is implemented for every gray level. Overshoot driving using a gray-level voltage in the range of Vv0 to Vv63 is effective even when a voltage lower than Vv0 and/or a voltage higher than Vv63 cannot be applied to the liquid crystal panel in view of the withstand voltage of the driver (driving circuit, and typically, driver IC) and extension of the controller).

Although the optical response characteristics (corresponding to charging characteristics) have been described for the case where the gray-level voltage is changed from a lower gray-level voltage to a higher gray-level voltage (i.e., rise of the response), the present invention is also effective in improving the optical response characteristics (corresponding to discharging characteristics) in the case where the gray-level voltage is changed from a higher gray-level voltage to a lower gray-level voltage (fall of the response). Since the liquid crystal response upon discharging is relatively slow as compared to that upon charging, the effect of overshoot driving is rather likely to be observed as improvement in fall response characteristics.

A specific example of the method for setting an overshoot voltage is shown in Table 1. Table 1 shows the case where the capacitance ratio of the storage capacitor Cs to the liquid crystal capacitor Clc is 1 or more. For comparison, Table 2 shows the case where the capacitance ratio of the storage capacitor Cs to the liquid crystal capacitor Clc is less than 1.

In each table, the numerical values in the right column indicate gray-level data regarding a gray-level voltage corresponding to the input image signal S of the previous field (the field immediately preceding the field to be displayed) (e.g., 255 for the gray-level voltage Vv255). The numerical values in the bottom row indicate gray-level data regarding a gray-level voltage corresponding to the input image signal S of the current field (the field to be displayed). The numerical values in each column of Tables 1 and 2 indicate the overshoot amount required to attain within a single field a steady-state transmittance of the gray-level voltage corresponding to the input image signal S of the current field. These numerical values indicate the overshoot amount as the difference in gray level. For example, the numerical value "−39" in the ninth row, third column of Table 1 indicates that the gray-level voltage Vv25 (64−39=25) must be supplied as a driving voltage in order to provide the display corresponding to Vv64 in the current field after providing the display corresponding to Vv255 in the previous field. As can be seen from the tables, it is preferable to adjust the overshoot amount according to the gray-level data of the previous field, even if the gray-level data of the current field is the same. Moreover, comparison between Tables 1 and 2 shows that, in the case where the capacitance ratio of the storage capacitor Cs to the liquid crystal capacitor Clc is less than 1 (Table 2), a larger overshoot amount is required as the gray-level data of the current field is greater. In other words, it is appreciated that the response characteristics in the high-band (the region where the gray-level voltage is high) can be improved by setting the capacitance ratio of the storage capacitor Cs to the liquid crystal capacitor Clc to 1 or more, as described above.

In Tables 1 and 2, the numerical values having the symbol "*" attached thereto indicates that, with that overshoot amount, a steady-state transmittance of the gray-level voltage corresponding to the input image signal S of the current field is not reached within one field. In other words, a dedicated overshoot-driving voltage must be provided separately.

TABLE 1

| Cs/Clc . 1 | | | | | | | | | |
|---|---|---|---|---|---|---|---|---|---|
| 0 | 7 | 7 | 8 | 21 | 23 | 63* | 31* | 0 | 0 |
| 0 | 0 | 7 | 7 | 20 | 22 | 56 | 31* | 0 | 32 |
| 0 | −4 | 0 | 7 | 16 | 18 | 54 | 31* | 0 | 64 |
| 0 | −5 | −4 | 0 | 14 | 17 | 51 | 31* | 0 | 96 |
| 0 | −9 | −5 | −4 | 0 | 11 | 45 | 31* | 0 | 128 |
| 0 | −9 | −8 | −8 | −7 | 0 | 38 | 31* | 0 | 160 |
| 0 | −19 | −20 | −14 | −17 | −14 | 0 | 25 | 0 | 192 |
| 0 | −25 | −26 | −21 | −25 | −26 | −14 | 0 | 0 | 224 |
| 0 | −32* | −39 | −37 | −37 | −48 | −36 | −42 | 0 | 225 |
| 0 | 32 | 64 | 96 | 128 | 160 | 192 | 224 | 255 | |

TABLE 2

| Cs/Clc < 1 | | | | | | | | | |
|---|---|---|---|---|---|---|---|---|---|
| 0 | 8 | 31 | 55 | 56 | 55 | 50 | 27 | 0 | 0 |
| 0 | 0 | 25 | 55 | 56 | 55 | 48 | 27 | 0 | 32 |
| 0 | −16 | 0 | 18 | 36 | 40 | 44 | 27 | 0 | 64 |
| 0 | −23 | −7 | 0 | 26 | 32 | 40 | 27 | 0 | 96 |
| 0 | −27 | −11 | −14 | 0 | 19 | 38 | 26 | 0 | 128 |
| 0 | −31 | −14 | −16 | −19 | 0 | 24 | 25 | 0 | 160 |
| 0 | −31 | −20 | −30 | −33 | −19 | 0 | 24 | 0 | 192 |
| 0 | −32* | −33 | −38 | −41 | −48 | −31 | 0 | 0 | 224 |
| 0 | −32* | −64* | −66 | −89 | −115 | −36 | −120 | 0 | 255 |
| 0 | 32 | 64 | 96 | 128 | 160 | 192 | 224 | 255 | |

(Liquid Crystal Material)

A liquid crystal material having a large value ϵ// and also having a value Δϵ that is small to such a degree that does not degrade the response capability is preferred for use in the LCD according to the second aspect of the present invention. The reason for this will be described below.

In order to reduce the step response resulting from an increase in capacitance of the picture-element capacitor Cpix (voltage drop) according to a change in orientation of the liquid crystal molecules, it is preferable that the difference between the capacitance in vertical orientation of the liquid crystal molecules and the capacitance in parallel orientation thereof is small. In other words, for a liquid crystal material having a positive dielectric anisotropy (Δϵ>0), it is preferable that (Cs+Clc⊥)/(Cs+Clc//)=1−Δϵ(S/d)/(Cs+Clc//) is large. Clc⊥ and Clc// indicate the capacitance of the liquid crystal capacitor Clc in vertical orientation of the liquid crystal molecules and in parallel orientation thereof, respectively. Moreover, Δϵ=ϵ//−ϵ⊥), Clc⊥=$\epsilon_0$·ϵ⊥(S/d), and Clc//=$_0$ϵ//(S/d). S indicates the area of a picture element (typically, picture-element electrode) of the liquid crystal capacitor Clc, and d indicates the thickness of the liquid crystal layer.

Thus, it is preferable that Δϵ is small. However, if Δϵ is small, the response capability of the liquid crystal molecules to the electric field is degraded. Therefore, it is preferable that Δϵ is not reduced as much as possible and that ϵ// is large. In general, however, as ϵ// is increased, the viscosity of the liquid crystal material is increased, degrading the response capability of the liquid crystal molecules to the electric field. Accordingly, it is preferable that the viscosity of the liquid crystal material is as low as possible.

Although the present embodiment has been described for the NW mode LCD, the LCD according to the second aspect of the present invention is also applicable to the NB mode LCD.

(Display Mode)

The LCD according to the second aspect of the present invention is applicable to various LCDs. The response characteristics of the liquid crystal panel depend on the response speed of the liquid crystal layer (liquid crystal material, orientation mode and the like). Accordingly, by using a liquid crystal layer having a high response speed, an LCD having rapid response characteristics and excellent viewing-angle characteristics can be obtained. Moreover, by applying the present invention to such an LCD, the residual image can be more effectively reduced, whereby an LCD having excellent viewing-angle characteristics and high image quality can be obtained.

For example, the present invention can be applied to the ECB (Electrically Controlled Birefringence) mode, transmission-type liquid crystal panel 20 using a parallel-orientation (homogeneous-orientation) liquid crystal layer, which is described in the first embodiment in connection with FIG. 7. Note that, since the structure of the transmission-type liquid crystal panel 20 is the same as that described in the first embodiment, description thereof is herein omitted.

In the liquid crystal panel 20 having the parallel-orientation liquid crystal layer, the retardation $d \cdot \Delta n$ of the liquid crystal layer 27 alone, i.e., the retardation except the phase compensators 23 and 24, is preferably in the range of about 270 nm to about 340 nm. With the thickness of the liquid crystal layer 27 being 4.5 μm, $\Delta n$=0.06 to 0.075, whereby a liquid crystal material having a smaller refractive index anisotropy $\Delta n$ than the typical value $\Delta n$=about 0.08 of the TN mode liquid crystal material can be used. For example, the liquid crystal material of the liquid crystal layer 27 has a refractive index anisotropy ($\Delta n$) of 0.06, and the thickness of the liquid crystal layer 27 is adjusted to 45 μm.

In general, the viscosity of the liquid crystal material decreases with decrease in $\Delta n$. This is also effective in reduction of the response time of the liquid crystal layer. On the contrary, in the case of using the liquid crystal material of $\Delta n$=about 0.08 as in the TN mode liquid crystal panel, the thickness of the liquid crystal layer 27 can further be reduced. As the thickness of the liquid crystal layer 27 is reduced, the response time is reduced approximately in proportion to the square of the reduction in thickness. Accordingly, the use of the homogeneous-orientation liquid crystal layer achieves significant effects in improving not only the viewing angle characteristics but also the moving picture display quality.

Moreover, an optical element for diffusing the light transmitted in or near the direction normal to the display plane (i.e., the display light) in the upward and downward directions with respect to the line of sight of the viewer, that is, an optical element having the lens effect only in a one-dimensional direction (e.g., BEF made by Sumitomo 3M Ltd.) is provided on the display plane of the liquid crystal panel 20. Thus, the liquid crystal panel having nearly constant display quality regardless of the viewing angle, and thus having an extremely wide viewing angle can be obtained.

Figure 17:
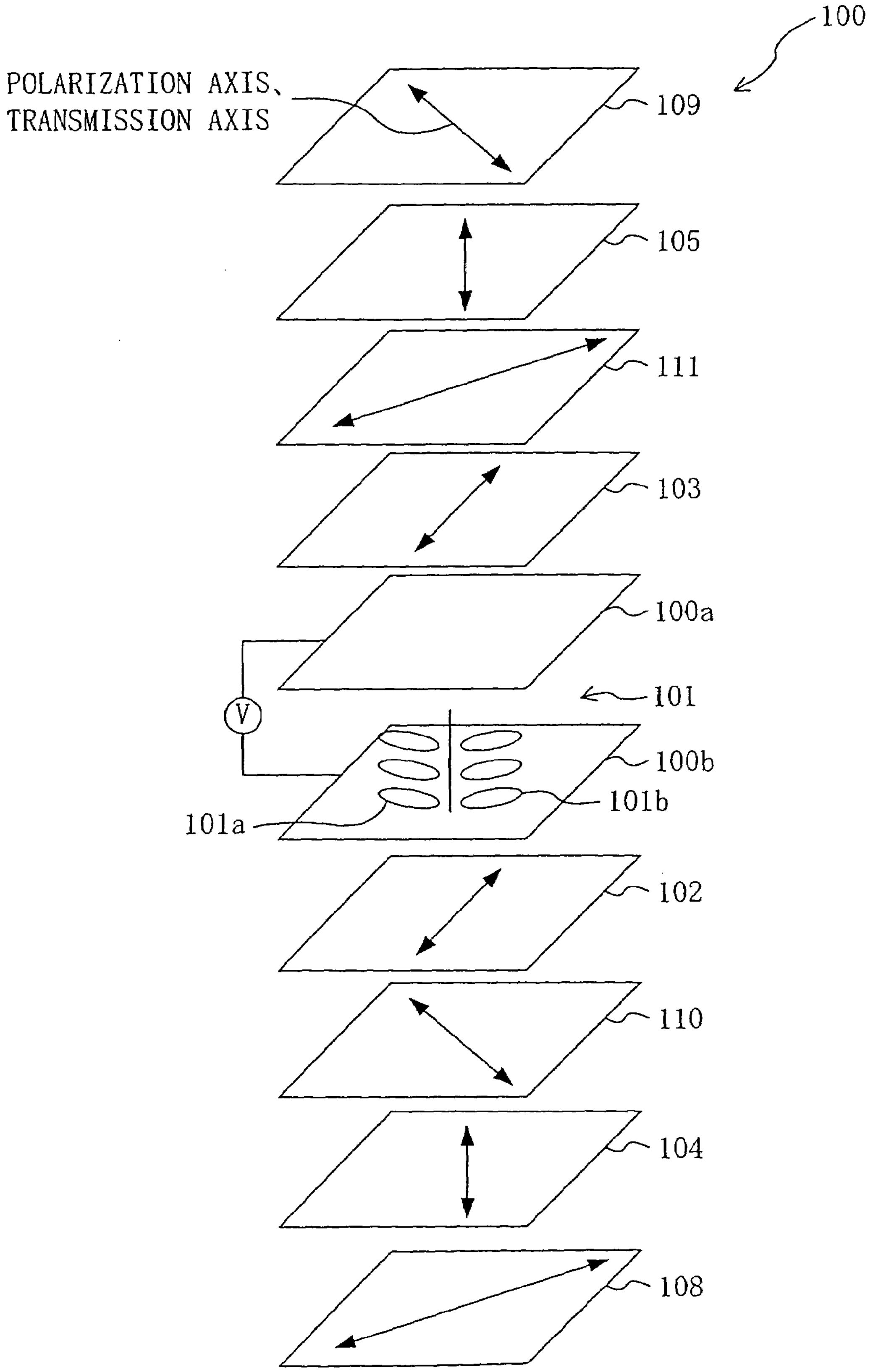
FIG. 17 is a diagram schematically showing an NB mode transmission-type liquid crystal panel using a parallel-orientation liquid crystal layer, which is included in the LCD according to the embodiment of the present invention.

FIG. 17 schematically shows an ECB (Electrically Controlled Birefrigence) mode liquid crystal panel 100 using a parallel-orientation (homogeneous-orientation) liquid crystal layer. The ECB mode is known as a liquid crystal mode of the NB mode having a fast response speed and excellent viewing-angle characteristics.

The liquid crystal panel 100 includes a liquid crystal layer 101, a pair of electrodes **10*a* and 100*b* for applying a voltage to the liquid crystal layer 101, a pair of phase plates (of course, phase compensation films may be used) 102 and 103 provided on both sides of the liquid crystal layer 101, phase plates 104, 105 and phase plates 110, 111 provided on the respective outer surfaces of the phase plates 102 and 103, and a pair of polarizing plates 108 and 109 interposing these elements therebetween and arranged in the crossed nicols state. Note that the phase plates 104, 105 and the phase plates 110, 111** may either be omitted, or one or a plurality of phase plates may be provided in any combination.

The arrow in each phase plate in FIG. 17 indicates an axis of its index ellipsoid (every index ellipsoid has a positive, uniaxial property) that has the maximum refractive index (i.e., a slow axis). The arrow in each polarizing plate 108, 109 indicates an polarization axis thereof (polarization axis=transmission axis, and polarization axis ⊥ absorption axis).

FIG. 17 shows orientation of the liquid crystal molecules (shown by ellipses in FIG. 17) within a single picture-element region in the liquid crystal layer 101 in the state where a voltage is not applied. A nematic liquid crystal material having a positive dielectric anisotropy is used as the liquid crystal material. When a voltage is not applied, the liquid crystal molecules are oriented approximately in parallel with the surface of a pair of substrates (not shown). The electrodes **100*a* and 100*b* are respectively formed on the pair of substrates so as to face the liquid crystal layer 101 and to interpose the liquid crystal layer 101 therebetween. In response to application of the voltage to the electrodes 100*a* and 100*b*, an electric field is produced in the liquid crystal layer 101 in the direction approximately perpendicular to the substrate surface. As shown in FIG. 17, the liquid crystal layer 101 has first and second domains 101*a* and 101*b* within each picture element region. The first and second domains 101*a* and 101*b* have different orientation states from each other. In the example of FIG. 17, the director of the liquid crystal molecules in the first domain 101*a* is oriented in an azimuth direction that is different by 180° from that of the director of the liquid crystal molecules in the second domain 101*b***.

The orientation of the liquid crystal molecules is controlled such that the liquid crystal molecules within the first domain **101*a* are raised clockwise as well as the liquid crystal molecules within the second domain 101*b* are raised counterclockwise in response to application of a voltage between the electrodes 101*a* and 101*b*. In other words, the orientation of the liquid crystal molecules is controlled such that the liquid crystal molecules in the first and second domains 101*a* and 101*b*** are raised in the opposite directions. Such orientation of the directors of the liquid crystal molecules can be implemented by the known alignment control technology using an alignment film. In the case where a plurality of first and second domains having the orientation directions of the respective directors different from each other by 180° are formed within a single picture-element region, the display characteristics can be averaged by smaller units. Therefore, further uniform viewing-angle characteristics can be obtained.

Each of the phase plates 102 and 103 typically has a positive, uniaxial refractive index anisotropy, and its slow axis (the arrow in FIG. 17) extends orthogonally to a slow axis (not shown) of the liquid crystal layer 101 in the state where a voltage is not applied. Accordingly, light leakage (degradation in black display level) can be suppressed which results from the refractive index anisotropy of the liquid crystal molecules in the state where a voltage is not applied (in the black display state).

Each of the phase plates 104 and 105 typically has a positive, uniaxial refractive index anisotropy, and its slow axis (the arrow in FIG. 17) extends perpendicularly to the substrate surface (i.e., perpendicularly to the respective slow axes of the liquid crystal layer 101, and phase plates 102 and 103), so as to compensate for a change in transmittance according to a change in viewing angle. Accordingly, with the use of the phase plates 104 and 105, the display having more excellent viewing-angle characteristics can be provided. Both of the phase plates 104 and 105 may be omitted. Alternatively, only one of the phase plates 104 and 105 may be used.

Each of the phase plates 110 and 111 typically has a positive, uniaxial refractive index anisotropy, and its slow axis (the arrow in FIG. 17) extends orthogonally to the polarization axis of the corresponding polarizing plates 108, 109 (i.e., makes an angle of 45° with the respective slow axes of the liquid crystal layer 101, and phase plates 102 and 103), so as to adjust the rotation of the polarization axis of elliptic polarization. Accordingly, with the use of the phase plates 110 and 111, the display having more excellent viewing-angle characteristics can be provided. Both of the phase plates 110 and 111 may be omitted. Alternatively, only one of the phase plates 110 and 111 may be used. The phase plates 102, 103, 104, 105, 110 and 111 do not necessarily have a uniaxial refractive index anisotropy, but may have a positive, biaxial refractive index anisotropy.

Embodiment 3

An LCD of the third embodiment is a TFT-type LCD as shown in FIG. 12. More specifically, the LCD of the third embodiment is a NW mode display device including the liquid crystal panel 20 shown in FIG. 7 and the driving circuit 10 shown in FIG. 4. This LCD will be described with reference to FIGS. 4, 7 and 12.

The TFT substrate 21 and CF substrate 22 forming the TFT-type liquid crystal panel are made according to a known method. The capacitance of a single storage capacitor Cs of the TFT substrate 21 is, e.g., 0.200 pF. An alignment film (which is formed from, e.g., polyimide or polyvinyl alcohol) is formed on each of the respective surfaces of the substrates 21 and 22 that face the liquid crystal layer 27. Then, the surface of each alignment film is rubbed in one direction.

The TFT substrate 21 and CF substrate 22 thus obtained are laminated with each other such that their respective rubbing directions are in anti-parallel with each other. Then, a nematic liquid crystal material of $\Delta\epsilon>0$ is introduced therebetween, whereby the liquid crystal cell 20*a* is obtained. The capacitance of a single liquid crystal capacitor Clc of the liquid crystal cell 20*a* is, e.g., 0.191 pF (when the highest gray-level voltage (7 V) is applied).

The phase plates 23 and 24 are respectively laminated to the outer surfaces of the TFT substrate 21 and CF substrate 22. The phase plates 23 and 24 are arranged such that the inclination direction of the respective index ellipsoids (counterclockwise in FIG. 7) is opposite to the pre-tilt direction of the liquid crystal molecules (clockwise in FIG. 7). Moreover, the pair of polarizers 25 and 26 are respectively laminated on the outer surfaces of the phase plates 23 and 24 so that the respective absorption axes of the polarizers extend orthogonally to each other and also make an angle of 45° with the rubbing direction. Thus, the liquid crystal panel 20 is obtained.

As described in the first embodiment in connection with FIG. 4, the driving circuit 10 receives an external input image signal S, and supplies a corresponding driving voltage to the liquid crystal panel 15. The driving circuit 10 includes the image storage circuit 11, combination detection circuit 12, overshoot voltage detection circuit 13, and polarity inversion circuit 14.

The image storage circuit 11 retains at least one field image of the input image signal S. The combination detection circuit 12 compares the input image signal S of the current field with the input image signal S of the previous field retained in the image storage circuit 11, and outputs a signal indicating that combination to the overshoot voltage detection circuit 13. The overshoot voltage detection circuit 13 detects a driving voltage corresponding to the combination detected by the combination detection circuit 12, from the gray-level voltage Vg and the dedicated overshoot-driving voltage.

The polarity inversion circuit 14 converts the driving voltage detected by the overshoot voltage detection circuit 13 into an AC signal for supply to the liquid crystal panel (display section) 15. Herein, the overshoot voltage is conducted also to the highest and lowest gray-level voltages.

Figure 18A:
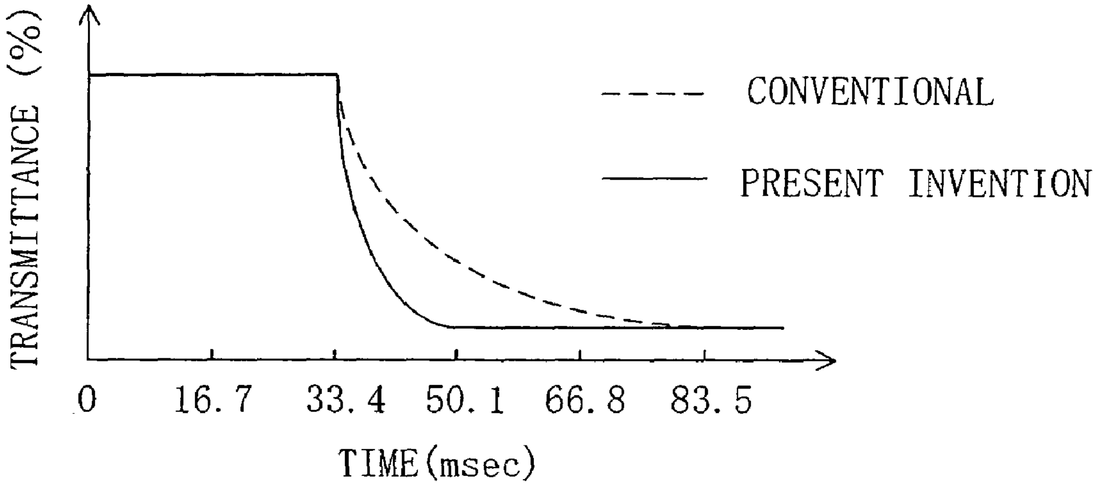
FIG. 18A is a diagram showing response characteristics of an LCD according to a third embodiment of the present invention.
Figure 18B:
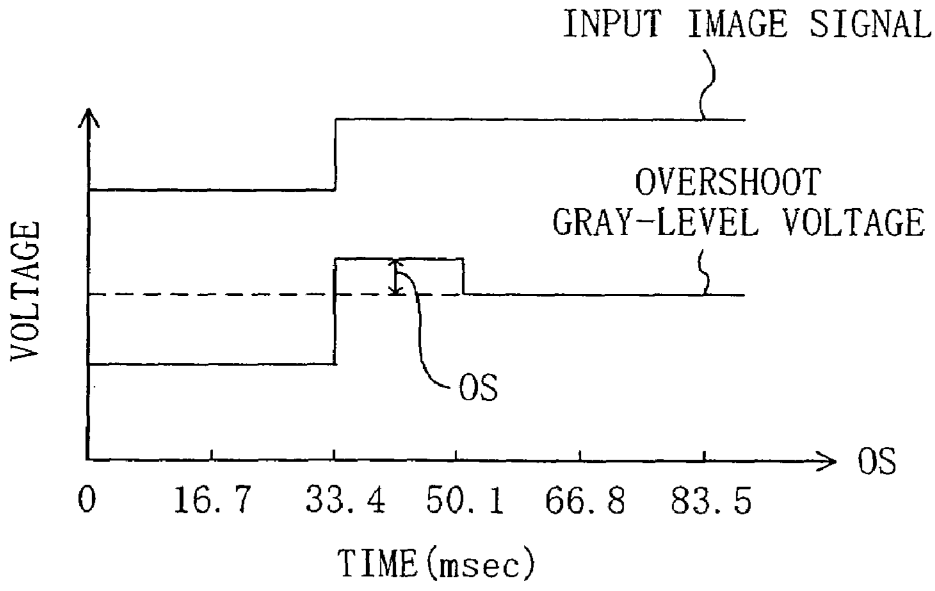
FIG. 18B is a diagram showing a driving voltage of the LCD according to the third embodiment of the present invention.

FIG. 18A shows respective response characteristics of the LCD of the present embodiment and a conventional LCD. The input image signal S is a signal at 60 Hz for one field, and the gray level changes rapidly in the third field from the gray level of the second field. As shown in FIG. 18B, in response to the change in gray level in the third field, the driving circuit 10 of the present embodiment supplies as a driving voltage an overshoot voltage to the liquid crystal panel 15 in the third field. More specifically, this overshoot voltage is a voltage overshooting (by the overshoot amount OS in the figure) the gray-level voltage corresponding to the input image signal S of the third field (this gray-level voltage is applied in the four and the following fields). From the third field, the input image signal S does not have any change in gray level. Therefore, the driving circuit 10 supplies as a driving voltage the gray-level voltage corresponding to the input image signal S to the liquid crystal panel 15 without overshooting the gray-level voltage.

As is apparent, the overshoot gray-level voltage (having its high band being enhanced) is supplied to the liquid crystal panel 15 in the third field, whereby the response characteristics are significantly improved over the conventional LCD (dashed line in the figure) in which a non-overshoot voltage gray-level voltage is applied.

Embodiment 4

An LCD of the fourth embodiment is a TFT-type LCD as shown in FIG. 12. More specifically, the LCD of the fourth embodiment is a NB mode display device including the liquid crystal panel 100 shown in FIG. 17 and the driving circuit 10 shown in FIG. 4. This LCD will be described with reference to FIGS. 4, 12 and 17.

The TFT substrate 100*b* and CF substrate 100*a* forming the TFT-type liquid crystal panel 100 are made according to a known method. The capacitance of a single storage capacitor Cs of the TFT substrate 100*b* is, e.g., 0.200 pF.

An alignment film is formed on each of the respective surfaces of the substrates 100*a* and 100*b* that face the liquid crystal layer 101. The surface of each alignment film is divided into two regions A and B in every picture element, and ultraviolet light (UV radiation) is radiated to the regions A and B. In the region A, the UV light is radiated to the alignment film on the CF substrate 100*a*. In the region B, the UV light is radiated to the alignment film on the TFT substrate 100*b*. Then, the surface of each alignment film is rubbed in a single direction. The TFT substrate 100*b* and CF substrate 100*a* are laminated with each other such that their respective rubbing directions are in parallel with each other. Then, a nematic liquid crystal material of $\Delta\epsilon>0$ is introduced therebetween, whereby a liquid crystal cell is obtained. The capacitance of a single liquid crystal capacitor Clc of the liquid crystal cell thus obtained is, e.g., 0.191 pF (when the highest gray-level voltage (7 V) is applied).

Figure 19A:
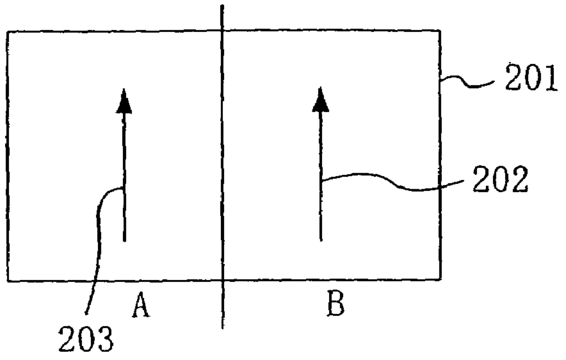
FIGS. 19A to 19C are diagrams illustrating orientation of liquid crystal molecules in a liquid crystal layer of an LCD according to a fourth embodiment of the present invention.
Figure 19B:
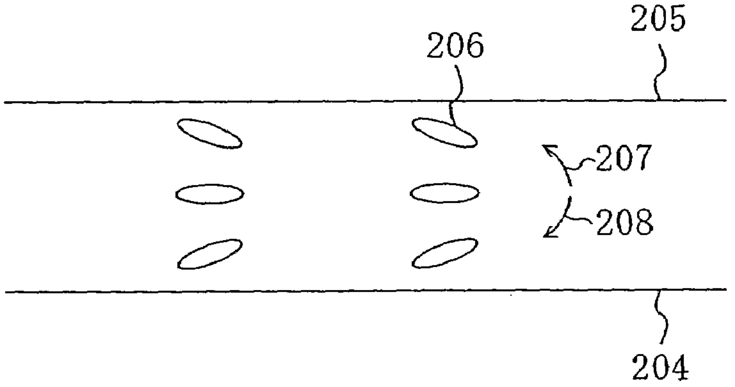
Figure 19C:
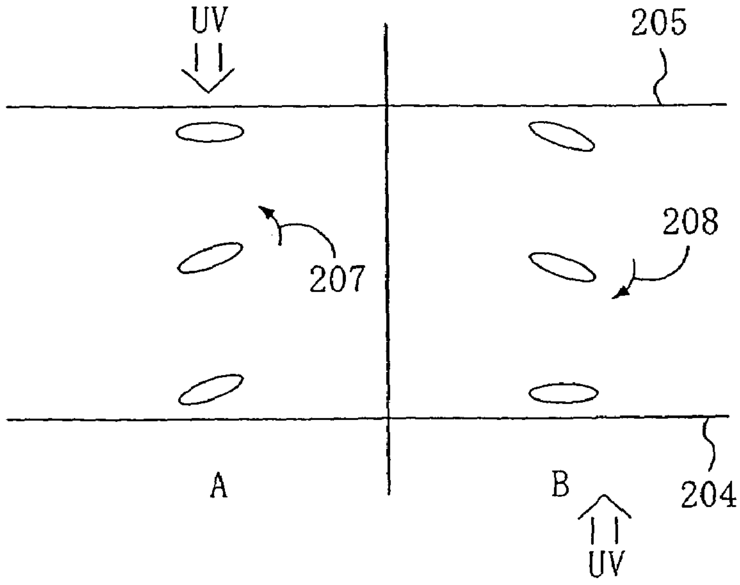

The orientation state of the liquid crystal molecules in this liquid crystal cell will be described with reference to FIGS. 19A to 19C. FIG. 19A shows that the two regions A and B within a single picture element 201 have the same rubbing direction 202, 203. As shown in FIG. 19B, if the above UV radiation is not conducted, liquid crystal molecules 206 located approximately in an intermediate layer of the liquid crystal layer are oriented approximately in parallel with the substrate surface when a voltage is not applied. When a voltage is applied to the liquid crystal layer, the liquid crystal molecules 206 located in the intermediate layer are raised in the direction shown by the arrow 207 or 208 with the same probability.

However, since the alignment films 205 and 204 have been subjected to the UV radiation in the regions A and B, respectively, the pre-tilt angle is reduced on the UV-radiated alignment films. As a result, as shown in FIG. 19C, the liquid crystal molecules 206 located approximately in the intermediate layer of the liquid crystal layer in the region A are rotated in the direction shown by the arrow 207, whereas the liquid crystal molecules 206 located approximately in the intermediate layer of the liquid crystal layer in the region B are rotated in the direction shown by the arrow 208. In other words, the alignment is controlled such that the pre-tilt direction of the liquid crystal molecules 206 located near the intermediate layer of the liquid crystal layer is different by 180° between the regions A and B. In the liquid crystal layer having such an orientation state, the two regions A and B compensate for the viewing-angle dependency with each other, resulting in excellent viewing-angle characteristics. Note that the liquid crystal layer having the aforementioned orientation is preferred. However, the viewing-angle characteristics can be improved by using a liquid crystal layer that has two or more regions having different orientation states of the liquid crystal molecules.

The phase plates and the polarizing plates are laminated onto the resultant liquid crystal cell as shown in FIG. 17, whereby the liquid crystal panel 100 is obtained.

Each region has the following alignment parameters.

TABLE 3

| Region | Ratio of Occupied area within picture element | Retardation | Twist angle | Alignment direction |
|---|---|---|---|---|
| A | 50% | 240 nm | 0 deg | 0 deg |
| B | 50% | 240 nm | 0 deg | 180 deg |

The polarizing plates 108 and 109 have the following parameters. Note that the angle of the transmission axis of each polarizing plate 108, 109 is an angle with respect to the orientation direction of the liquid crystal molecules.

TABLE 4

| Polarizing plate No. | Angle of transmission axis |
|---|---|
| 108 | 45 deg |
| 109 | −45 deg |

The phase plates 102 to 105, 110 and 111 have the following parameters. In Table 5, na, nb and nc are three principal refractive indices of the index ellipsoid of the phase plate; d is the thickness of the phase plate; d·(na–nb) is a retardation within a plane that is in parallel with the display plane of the liquid crystal panel 100; and d·(na–nc) is a retardation in the thickness direction. The angle of na-axis is an angle with respect to the orientation direction of the liquid crystal molecules.

TABLE 5

| Phase plate No. | d · (na − nb) | D · (na − nc) | Angle of na-axis |
|---|---|---|---|
| 102 | 120 nm | 0 nm | 90 deg |
| 103 | 120 nm | 0 nm | 90 deg |
| 104 | 0 nm | −120 nm | 90 deg |
| 105 | 0 nm | −120 nm | 90 deg |
| 110 | 25 nm | 0 nm | −45 deg |
| 111 | 25 nm | 0 nm | 45 deg |

The liquid crystal panel 100 has the regions A and B in every picture element, which have different orientation directions of the liquid crystal molecules. Moreover, the phase plates compensate for the viewing-angle characteristics.

Accordingly, the liquid crystal panel 100 has wide viewing-angle characteristics.

Since the driving circuit 10 is the same as that of the third embodiment, description thereof is herein omitted.

Figure 20:
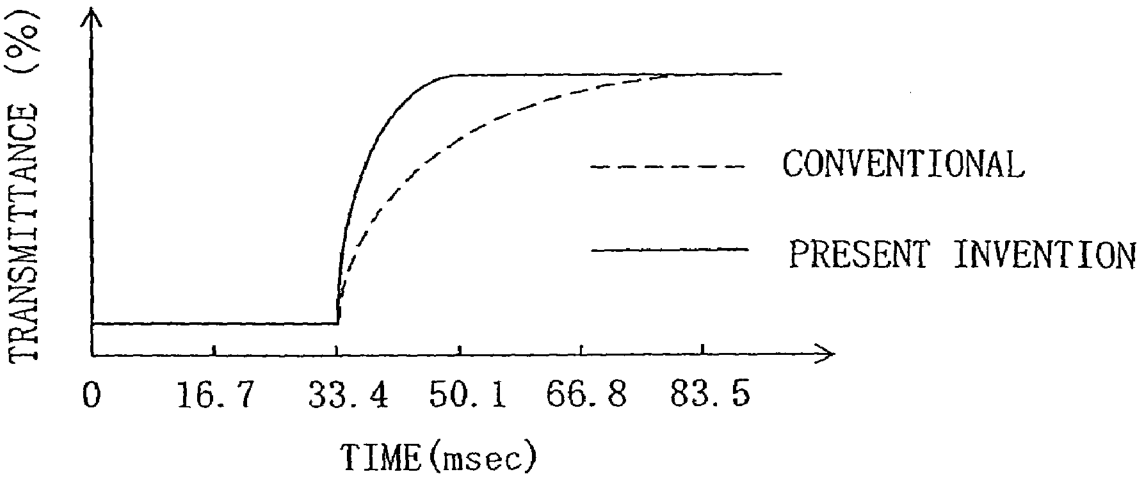
FIG. 20 is a diagram showing response characteristics of the LCD according to the fourth embodiment of the present invention.
Figure 21:
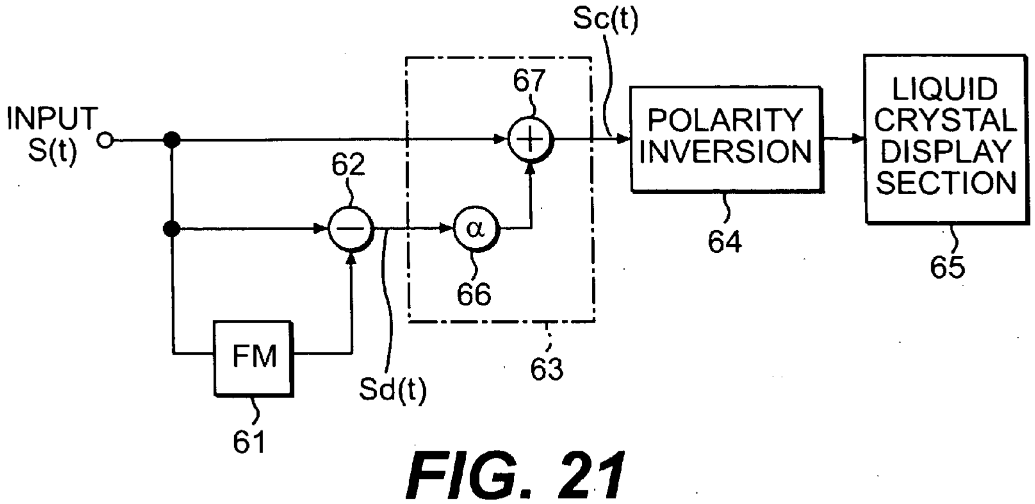
FIG. 21 PRIOR ART
FIG. 21 is a schematic diagram showing the structure of a driving circuit of a conventional LCD.
Figure 22:
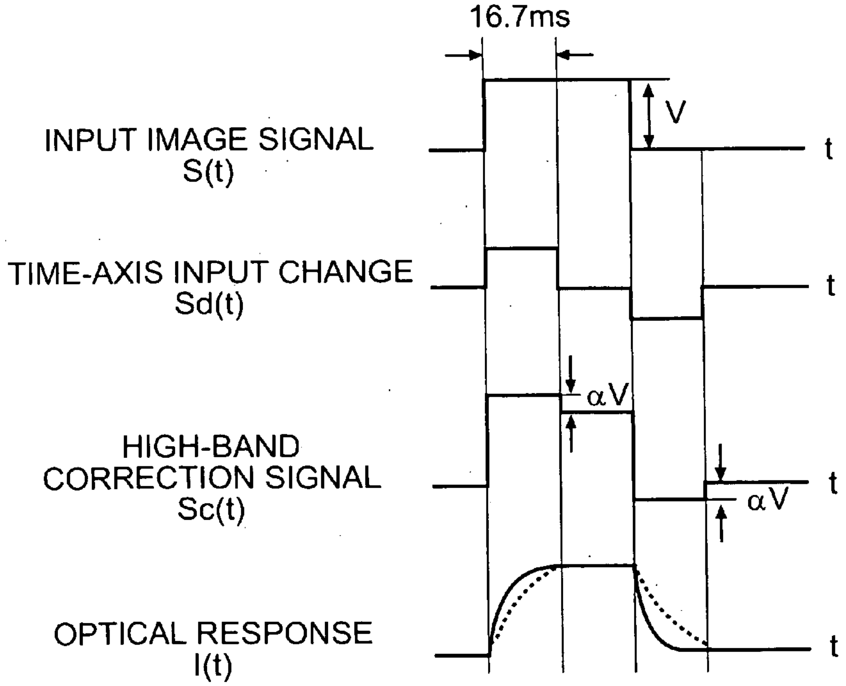
FIG. 22 is a signal waveform chart illustrating how the response characteristics are improved with the driving circuit shown in FIG. 21.

FIG. 20 shows response characteristics of the LCD of the present embodiment. As in the third embodiment, the input image signal S is a signal at 60 Hz for one field, and the gray level changes rapidly in the third field from the gray level of the second field. As shown in FIG. 18B in the third embodiment, in response to the change in gray level in the third field, the driving circuit 10 supplies as a driving voltage an overshoot voltage to the liquid crystal panel 15 in the third field. More specifically, this overshoot voltage is a voltage overshooting (by the overshoot amount OS in the figure) the gray-level voltage corresponding to the input image signal S of the third field (this gray-level voltage is applied in the four and the following fields). From the third field, the input image signal S does not have any change in gray level. Therefore, the driving circuit 10 supplies as a driving voltage the gray-level voltage corresponding to the input image signal S to the liquid crystal panel 15 without overshooting the gray-level voltage.

As is apparent, the overshoot gray-level voltage (having its high band being enhanced) is supplied to the liquid crystal panel 15 in third field, whereby the response characteristics are significantly improved over the conventional LCD (dashed line in the figure) in which a non-overshoot voltage gray-level voltage is applied.

Note that an interlace-driven LCD in which a single field corresponds to a single vertical period has been described in the present embodiment. However, the LCD according to the second aspect of the present invention is not limited to this, but can also be applied to a non-interlace driven LCD in which a single frame corresponds to a single vertical period.

According to the present invention, an LCD having an improved fall response speed is provided. In particular, by applying the present invention to a parallel-orientation liquid crystal layer, the response time can be reduced down to about 10 msec.

The LCD according to the present invention has a high response speed. Therefore, blurred image resulting from the residual image phenomenon in the moving picture display is prevented from being produced, allowing for high-quality moving picture display.

According to the present invention, by setting the capacitance ratio of the storage capacitor Cs to the liquid crystal capacitor Clc (Cs/Clc) to 1 or more, the response speed (step response characteristics) of the charging characteristics of the picture-element capacitor is improved. Accordingly, when at least the highest gray-level voltage is applied, the picture-element capacitor Cpix retains 90% or more of the charging voltage over one vertical period. Therefore, an LCD with improved response characteristics in a high band (a high gray-level voltage region) is provided. Moreover, for an intermediate gray level having a low response speed, rapid response is implemented by overshoot driving.

By applying the present invention to a display device of a liquid crystal mode having both wide viewing-angle characteristics and a relatively high response speed, an LCD having both wide viewing-angle characteristics and excellent moving picture display characteristics can be implemented.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention that fall within the true spirit and scope of the invention.

What is claimed is:

1. A liquid crystal display device, comprising:

a liquid crystal panel including a liquid crystal layer and an electrode for applying a voltage to the liquid crystal layer; and a driving circuit for supplying a driving voltage to the liquid crystal panel, wherein the liquid crystal panel exhibits, in its voltage-transmittance characteristics, an extreme transmittance at a voltage equal to or lower than a lowest gray-level voltage, and the driving circuit supplies to the liquid crystal panel a predetermined driving voltage overshooting a gray-level voltage corresponding to an input image signal of a current vertical period, according to a combination of an input image signal of an immediately preceding vertical period and the input image signal of the current vertical period.

2. The liquid crystal display device according to claim 1, wherein a difference in retardation of the liquid crystal panel between a state where a voltage is not applied and a state where a highest gray-level voltage is applied is 300 nm or more.

3. The liquid crystal display device according to claim 1, wherein the liquid crystal panel is a transmission-type liquid crystal panel, and the extreme transmittance provides a maximum transmittance.

4. The liquid crystal display device according to claim 1, wherein a signal vertical period of the input image signal corresponds to a single frame, at least two fields of the driving voltage correspond to a single frame of the input image signal, and the driving circuit supplies, at least in a first field of the driving voltage, a driving voltage overshooting a gray-level voltage corresponding to an input image signal of a current field to the liquid crystal panel.

5. The liquid crystal display device according to claim 1, wherein the liquid crystal layer is a homogeneous-orientation liquid crystal layer.

6. The liquid crystal display device according to claim 1, wherein the liquid crystal panel further includes a phase compensator, three principal refractive indices na, nb and nc of an index ellipsoid of the phase compensator have a relation of na=nb>nc, and the phase compensator is arranged so as to cancel at least a part of retardation of the liquid crystal layer.

7. A liquid crystal display device, comprising:

a liquid crystal panel including a plurality of picture-element capacitors arranged in a matrix, and thin film transistors respectively electrically connected to the plurality of picture-element capacitors; and a driving circuit for supplying a driving voltage to the liquid crystal panel, wherein the liquid crystal display device updates display every vertical period by rendering the plurality of picture-element capacitors in a charged state corresponding to the input image signal each of the plurality of picture-element capacitors includes a liquid crystal capacitor formed from a corresponding picture-element electrode, a counter electrode and a liquid crystal layer provided between the picture-element electrode and the counter electrode, and a storage capacitor electrically connected in parallel with the liquid crystal capacitor, a capacitance ratio of the storage capacitor to the liquid crystal capacitor being 1 or more, and the picture-element capacitor retains 90% or more of a charging voltage over a single vertical period, when at least a highest gray-level voltage is applied.

8. The liquid crystal display device according to claim 7, wherein the driving circuit supplies to the liquid crystal panel a predetermined driving voltage overshooting a gray-level voltage corresponding to an input image signal of a current vertical period, according to a combination of an input image signal of an immediately preceding vertical period and the input image signal of the current vertical period.

9. The liquid crystal display device according to claim 8, wherein, for the input image signal of every gray level, the driving circuit supplies to the liquid crystal panel the driving voltage overshooting the gray-level voltage corresponding to the input image signal of the current vertical period.

10. The liquid crystal display device according to claim 7, wherein the liquid crystal layer of the liquid crystal panel includes a nematic liquid crystal material having a positive dielectric anisotropy, the liquid crystal layer included in each of the plurality of picture-element capacitors includes first and second regions having different orientation directions, and the liquid crystal panel further includes a pair of polarizers arranged so as to orthogonally cross each other with the liquid crystal layer interposed therebetween, and a phase compensator for compensating for a refractive index anisotropy of the liquid crystal layer in black display state.

11. The liquid crystal display device according to claim 7, wherein the liquid crystal layer is a homogeneous-orientation liquid crystal layer.

12. The liquid crystal display device according to claim 11, wherein the liquid crystal panel further includes a phase compensator, three principal refractive indices na, nb and nc of an index ellipsoid of the phase compensator have a relation of na =nb>nc, and the phase compensator is arranged so as to cancel at least a part of retardation of the liquid crystal layer.

13. A liquid crystal display device, in which a driving circuit applies a driving voltage to a liquid crystal panel to control the transmittance of the liquid crystal panel for display, wherein:

the liquid crystal panel exhibits, in its voltage-transmittance characteristics, a maximum or minimum transmittance at a voltage lower than a lowest gray-level voltage; and the driving circuit selectively supplies to the liquid crystal panel as a predetermined driving voltage corresponding to an input image signal of a current vertical period, according to a combination of an input image signal of an immediately preceding vertical period and an input image signal of the current vertical period, at least a gray-level voltage which falls within a range between the lowest gray-level voltage and the highest gray-level voltage, and an overshoot gray-level voltage which is lower than the lowest gray-level voltage.

14. A liquid crystal display device according to claim 13, wherein:

the liquid crystal panel is a normally white mode liquid crystal panel.

15. A liquid crystal display device according to claim 14, wherein the driving circuit selectively applies the gray-level voltage which falls within a range between the lowest gray-level voltage and the highest gray-level voltage, the overshoot voltage which is lower than the lowest gray-level voltage, and an overshoot gray-level voltage which is higher than the highest gray-level voltage.

16. A liquid crystal display device according to claim 13, wherein:

the liquid crystal panel is a normally black mode liquid crystal panel.

17. A liquid crystal display device according to claim 16, wherein the driving circuit selectively applies the gray-level voltage which falls within a range between the lowest gray-level voltage and the highest gray-level voltage, the overshoot voltage which is lower than the lowest gray-level voltage, and an overshoot gray-level voltage which is higher than the highest gray-level voltage.

18. A liquid crystal display device, comprising:

a liquid crystal panel including a plurality of picture-element capacitors arranged in a matrix, and thin film transistors respectively electrically connected to the plurality of picture-element capacitors; and means for supplying, to the liquid crystal panel, a driving voltage overshooting a gray-level voltage corresponding to an input image signal of a current vertical period, according to a combination of an input image signal of an immediately preceding vertical period and the input image signal of the current vertical period, wherein the liquid crystal display device updates display every vertical period by rendering the plurality of picture-element capacitors in a charged state corresponding to the input image signal each of the plurality of picture-element capacitors includes a liquid crystal capacitor formed from a corresponding picture-element electrode, a counter electrode and a liquid crystal layer provided between the picture-element electrode and the counter electrode, and a storage capacitor electrically connected in parallel with the liquid crystal capacitor, a capacitance ratio of the storage capacitor to the liquid crystal capacitor being 1 or more, and the picture-element capacitor retains 90% or more of a charging voltage over a single vertical period, when at least a highest gray-level voltage is applied.

* * * * *